United States Patent [19]

Lavelle et al.

[11] Patent Number: 4,642,794
[45] Date of Patent: Feb. 10, 1987

[54] VIDEO UPDATE FIFO BUFFER

[75] Inventors: Michael G. Lavelle; Claude A. Goldsmith; Allin D. Kingsbury, all of San Jose, Calif.

[73] Assignee: Motorola Computer Systems, Inc., Cupertino, Calif.

[21] Appl. No.: 536,913

[22] Filed: Sep. 27, 1983

[51] Int. Cl.⁴ .................. G06F 3/153; G09G 1/06
[52] U.S. Cl. .................... 364/900; 340/726
[58] Field of Search ... 364/200 MS File, 900 MS File, 364/521; 340/721, 724, 726, 799, 709, 750

[56] References Cited

U.S. PATENT DOCUMENTS

| | | | |
|---|---|---|---|
| 3,388,391 | 6/1968 | Clark | 340/706 X |
| 4,204,206 | 5/1980 | Bakula | 340/721 |
| 4,278,973 | 7/1981 | Hughes | 340/721 |
| 4,399,435 | 8/1983 | Urabe | 340/750 |
| 4,404,554 | 9/1983 | Tweedy | 340/750 |
| 4,412,294 | 10/1983 | Watts | 364/900 |
| 4,484,302 | 11/1984 | Cason | 340/721 |
| 4,602,251 | 7/1986 | Sawado et al. | 340/724 |
| 4,611,202 | 9/1986 | DiNitto et al. | 340/724 |

Primary Examiner—James D. Thomas
Assistant Examiner—Florin Munteanu
Attorney, Agent, or Firm—Walter W. Nielsen

[57] ABSTRACT

In a video terminal comprising a terminal processor communicating with a central processor, and a single-block non-interleaved video memory for storing video information for displaying on the terminal screen, a video update FIFO buffer is provided for buffering video information between the terminal processor and the video memory. The 3-word FIFO buffer is filled during screen trace, and it transfers its contents into the video memory during screen retrace periods.

The FIFO buffer permits screen information to appear without flicker. It also permits scrolling of row segment screen information by reading a row segment from the video memory, temporarily storing it, and then writing it into an adjacent row segment. It also permits flexible cursor symbols, cursor blinking of individual display screen areas, and certain data format conversions.

In addition, the FIFO buffer is bidirectional, being able to both read data into and write data from the video memory, enabling information stored in the video memory to be accessed by the terminal processor for diagnostic purposes.

13 Claims, 20 Drawing Figures

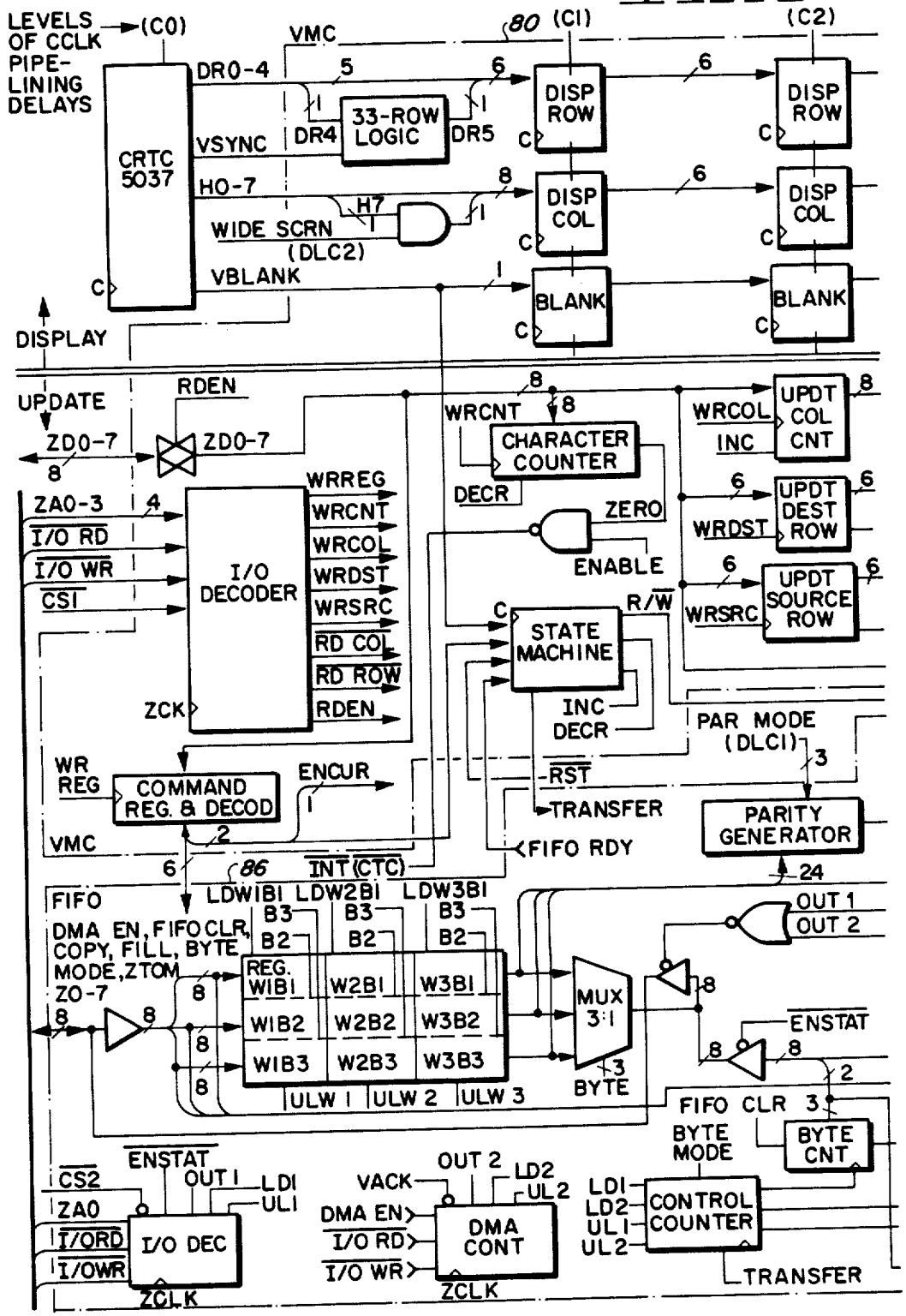

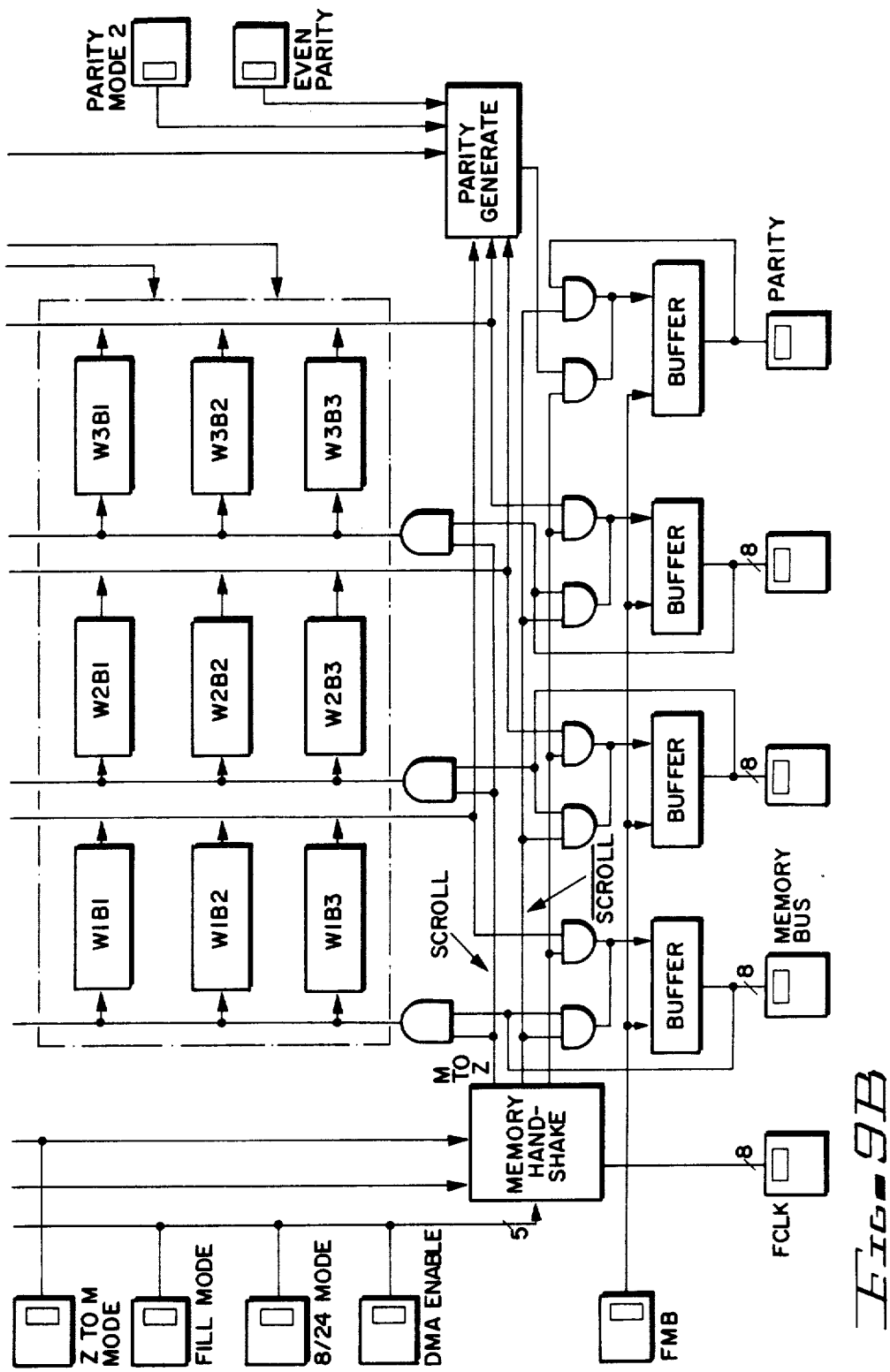

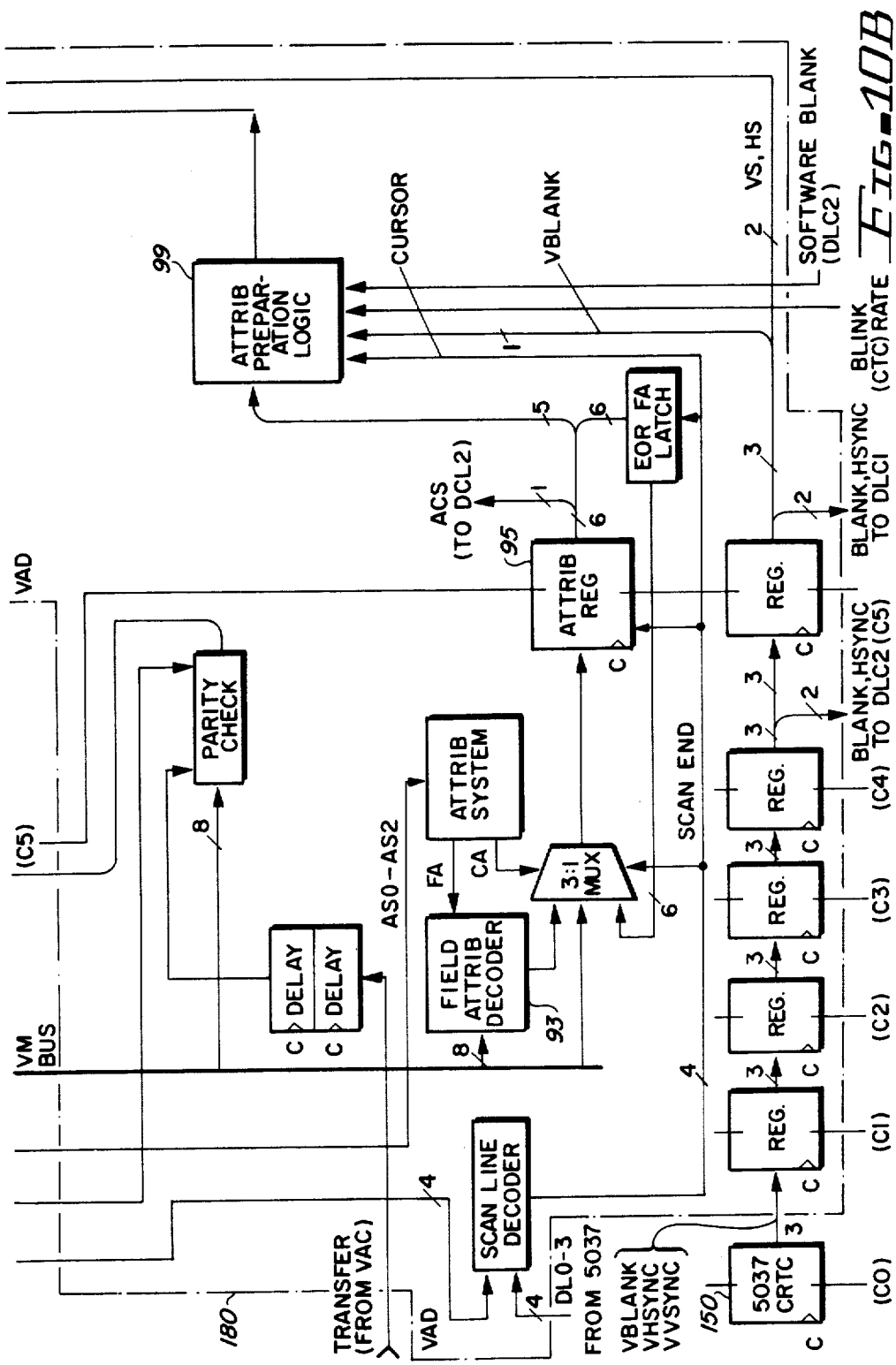

VIDEO UPDATE FIFO BUFFER

RELATED INVENTIONS

Video Memory Controller, invented by M. Lavelle, U.S. Ser. No. 536,911, filed on even date herewith and assigned to the assignee of the present invention.

Local Video Controller With Change Detect, invented by E. Ng, U.S. Ser. No. 536,912, filed on even date herewith and assigned to the assignee of the present invention.

TECHNICAL FIELD

This invention relates generally to a data processing system, and, in particular, to a video update FIFO buffer in a computer terminal.

BACKGROUND OF THE INVENTION

The present invention concerns an improvement to a video display terminal which is communicating with a data processing system.

It is known in the data processing arts to provide a multi-terminal data processing system in which a central processor and large central memory are shared by a number of intelligent terminals. User application programs and data are stored in the central memory. The central processor provides time-multiplexed access to the central memory by the terminals and may provide inter-terminal communications. Each intelligent terminal contains a keyboard for the entry of data and commands and a video display unit for displaying information to the user.

In such a system it is desirable to minimize the time that the central processor spends servicing each terminal, since by minimizing this time the size of the central processor may be kept relatively small. Alternatively, relatively more terminals may be serviced from the central processor.

It is known to provide "intelligence" at each terminal in the form of one or more terminal processors, terminal memories, and associated circuitry, in order to reduce the workload on the central processor. The terminal processor ordinarily requires at least some terminal memory to store routines and data to perform its various functions, which may include power-up and boot-loading, keyboard input, video display, printing, and communicating.

To reduce the workload on the terminal processor, it is known to improve terminal processor throughput by providing a separate video memory for storing data to be displayed on the screen. This avoids the necessity of the terminal processor sharing its memory workspace with the video display memory and consequently losing bus cycles every time a display memory access is made. By providing a separate video display memory, the terminal processor does not lose any bus cycles during screen refresh operations.

In the data processing system just described it is of course necessary to update the information stored in the video memory from time to time in order to update the information displayed on the screen. Since the video memory contents are accessed during screen trace time—i.e., when information is provided to the screen video circuits for display on the video screen—the only time available in which to update the video memory contents without introducing screen flicker is during screen retrace—i.e., when the CRT beam is retracing to its initial position. The screen retrace time is very short relative to the terminal processor interrupt response time and bus cycle time.

It is known in the prior art to utilize the video memory in an interleaved mode. The video memory is divided into two interleaved portions. As one portion is being accessed to refresh the screen, the other portion can be accessed by the terminal processor to update the information stored in the video memory. However, the interleaved memory technique has the disadvantage that two separate data busses are required on the circuit board containing the video generator circuitry. This increases the I/O pin count and circuit complexity and correspondingly increases the costs of the components and circuit packaging.

Thus there is a need for a technique for accessing the video memory for screen refresh and updating purposes which does not require interleaved memory but can utilize a single, integrated memory and which is fast enough to keep up with the terminal processor data rate and yet update the video memory only during screen retrace time.

The present invention provides the above advantages. In addition, the video update FIFO register of the present invention permits scrolling of either an entire line or of just a line segment through the use of the video memory controller (VMC) hardware circuitry primarily. Whereas scrolling of a line or line segment is known in the prior art, such is ordinarily accomplished primarily by the terminal processor using software routines which tie up the terminal processor. Thus the scrolling technique offered by the present invention has the advantage of easing the workload of the terminal processor for other tasks.

The present invention also enables either an entire line or merely a line segment to be "filled" with any selected character in response to a single terminal processor command.

In addition, the video update FIFO register of the present invention has the capability of reading any desired location within the video memory for diagnostic purposes and providing the contents of such location for inspection by the terminal processor. This mode can also be used to provide a blinking cursor in each of several independent video screen display areas.

The present invention provides the above-mentioned advantages by providing a 3-stage FIFO register between the terminal processor and the video memory. Each stage may, for example, comprise a three-byte word, each byte comprising 8 bits. The FIFO buffers the relatively steady stream of update information coming from the terminal processor and dumps it into the video memory during each screen retrace time.

The FIFO register responds to various terminal processor commands, one of which is to copy a line or line segment over another line or line segment, in effect "scrolling" the information appearing on the screen. An entire line or merely a line segment may be scrolled in response to a single terminal processor command.

The FIFO register operates bidirectionally. While its usual mode is to transfer update information from the terminal processor to the video memory, it can operate in reverse, as mentioned above, to read the contents of any video memory location back to the terminal processor for diagnostic purposes. The FIFO read mode is also used to generate a blinking cursor in each of several independent video screen display areas.

BRIEF SUMMARY OF INVENTION

Accordingly, it is an object of the present invention to provide an improved video display terminal.

It is also an object of the present invention to provide an improved video display terminal comprising a video update FIFO buffer, which video update FIFO buffer operates in response to commands from a terminal processor.

It is a further object of the present invention to provide an improved video display terminal in which a video update FIFO buffer is provided to buffer screen update information being transmitted to the video memory by the terminal processor.

It is another object of the present invention to provide an improved video display terminal in which a line of video display information or portion thereof may be scrolled or "filled" in response to a single terminal processor command.

It is yet another object of the present invention to provide an improved video display terminal in which a bidirectional video update FIFO buffer is provided which can either write data into or read data from the video memory in response to terminal processor commands.

These and other objects are achieved in accordance with a preferred embodiment of the invention by providing in a data processing system comprising a central processor and a terminal communicating with the central processor, such terminal comprising a terminal processor, a display, and a display memory, the improvement comprising a FIFO register located at the terminal and coupled to the terminal processor and to the display memory, the FIFO register transferring data from the terminal processor to the display memory.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIGS. 6 and 7 are a detailed block diagram illustrating the terminal video memory circuitry, including the video memory controller logic and the FIFO logic.

FIGS. 9A and 9B are a detailed block diagram illustrating the video memory FIFO circuitry.

FIGS. 10A, 10B, and 10C are a detailed block diagram illustrating the terminal character generator logic.

DETAILED DESCRIPTION OF THE INVENTION

Table of Contents

GENERAL DESCRIPTION OF DATA PROCESSING SYSTEM
GENERAL DESCRITPION OF LVC AND TERMINAL
TERMINAL PROCESSOR CIRCUITRY
TERMINAL VIDEO GENERATOR CIRCUITRY
TERMINAL VIDEO MEMORY CIRCUITRY
TERMINAL CHARACTER GENERATOR CIRCUITRY
VIDEO MEMORY CONTROLLER
LVC COMMANDS
TERMINAL PROCESSOR SIGNALS AND BUS CYCLES
VIDEO MEMORY READ AND WRITE OPERATIONS
SCROLLING AND FILLING OPERATIONS
VIDEO MEMORY FIFO REGISTER
CURSOR DETECTOR

GENERAL DESCRIPTION OF DATA PROCESSING SYSTEM

Figure 1:
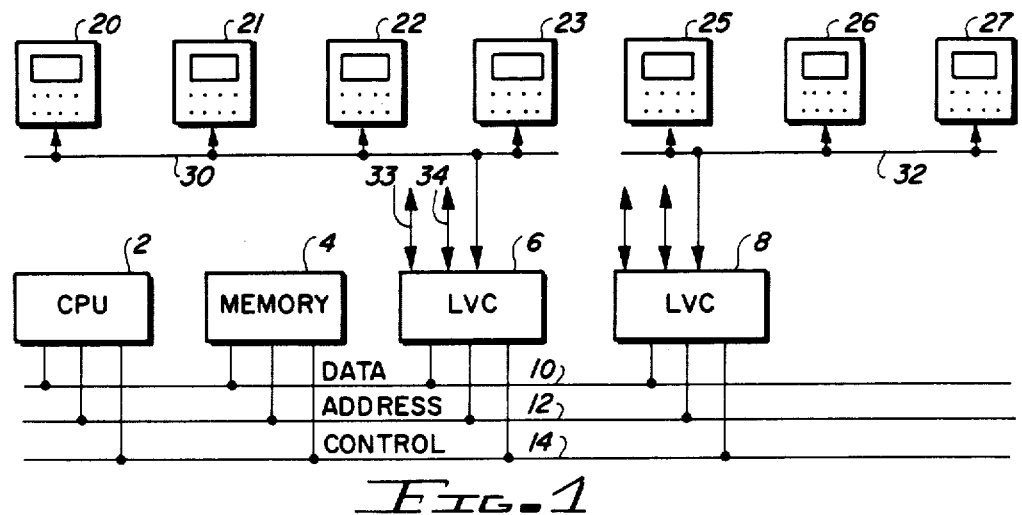
FIG. 1 is a block diagram illustrating a data processing system utilizing the video update FIFO buffer of the present invention.

FIG. 1 is a block diagram illustrating a data processing system utilizing the video update FIFO buffer of the present invention. The data processing system comprises central processor (CPU) 2, main memory 4, and local video controllers (LVC) 6 and 8. CPU 2, memory 4, and the LVC's 6 and 8 are interconnected by means of data bus 10, address bus 12, and control bus 14. It will be understood that these busses actually comprise plural conductors, and that they have been illustrated as single lines merely for convenience of illustration. LVC 6 is shown coupled to terminals 20-23 via channel 30, which actually comprises data, address, and control lines. LVC 8 is shown coupled to terminals 25-27 via bus 32.

The data processing system may be configured in many different ways and for many different purposes, including, for example, a multi-user, multi-tasking office system.

GENERAL DESCRIPTION OF LVC AND TERMINAL

The LVC serves as a communications controller for conducting bidirectional communications between the central system, comprising CPU 2 and memory 4, and one or more terminals. In a preferred embodiment, each LVC can control up to 8 different channels. In FIG. 1, LVC 6 is shown as having channels 30, 33, and 34. Each channel can control up to 8 different terminals. Thus, in a preferred embodiment each LVC can control up to 64 individual terminals.

Each terminal may include a keyboard for operator entry of data and commands, and a video display for communication with the operator by the data processing system.

Each LVC, which may be up to 10,000 feet away from CPU 2, transmits data from video data blocks in memory 4 to the local terminals using a high speed synchronous protocol. The video data blocks are sent over a coaxial or twisted pair cable at the rate of over 60,000 bytes per second. Only changed data is transmitted, to reduce the transmission bandwidth. This data is buffered, checked, formatted, and displayed at the terminal. The terminal also buffers keystrokes from its associated keyboard and transmits this data to the LVC when polled by the LVC.

Each local terminal receives data and command information in 192 byte message frames from the LVC. Keystrokes are buffered at the terminal and labeled with the terminal address and an identifier tag code. Status messages and auxiliary device inputs are labeled with different identifier tags to distinguish them from the terminal's keyboard.

The terminals are provided with programmable screen dimensions. Screen sizes as large as 33 rows by 132 columns (line printer width) or 64 rows by 96 columns (typewriter page) are available. They also utilize expanded attributes (reverse video, blinking characters, cursor position, and underscore).

In addition, expanded character sets and character descenders are available. Alternate character sets and user-defined character fonts may be downloaded from the CPU 2. Business (character mosaic) graphics are also available.

Figure 3:
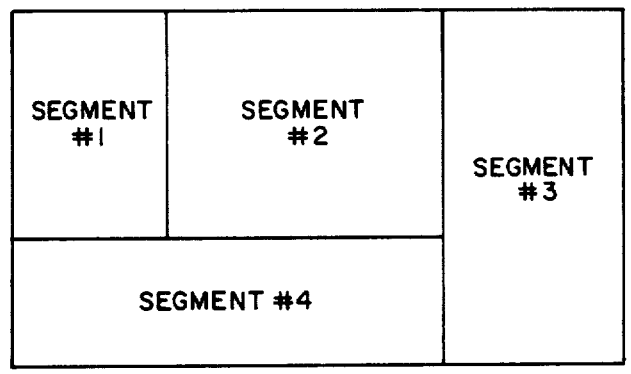
FIG. 3 is a representation of a segmented video display screen.

By means of segmented video displays, independent files and applications may be viewed on the same screen without interference. Refer to FIG. 3 which illustrates a screen 140 divided into 4 working segments. Cursor types and attributes may be assigned on a segment basis. Each screen segment is from a separate data block in memory 4 and may be independently controlled. Several attribute systems can be selected, vertical scrolling of individual segments is possible, and the segment display size is programmable. Two character sets of 256 characters each can be provided, and the available attributes include blanking, blinking, brightness, reverse video, and underlining. The height, width, and position of each segment within the viewing area are set by a DEFINE SEGMENT command sent to the terminal by processor 2.

DEFINE SEGMENT and REDEFINE BORDER commands from CPU 2 may be used to cause the terminal firmware to automatically draw a border around any segment. The border will be drawn in the character positions adjacent to the segment. Software chooses appropriate start row and column parameters in the DEFINE SEGMENT commands used to construct the screen. These parameters ensure that at least one character separates adjacent segments. Borders may be shared among segments. Six codes in each character set are reserved for drawing borders around segments. These characters are the upper left and right corners, lower left and right corners, and horizontal and vertical sides.

TERMINAL PROCESSOR CIRCUITRY

Figure 2:
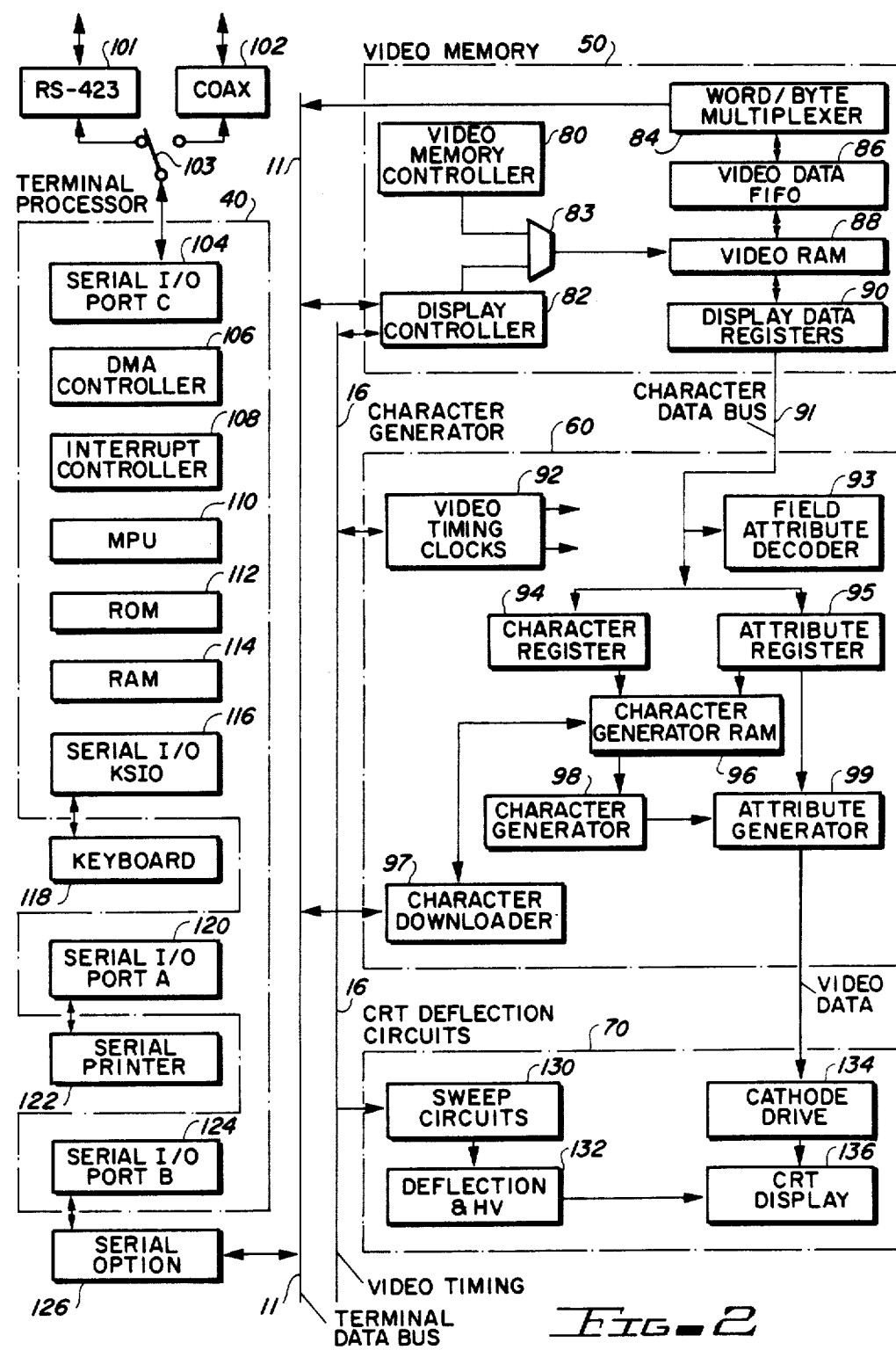
FIG. 2 is a block diagram illustrating the terminal circuitry including the video update FIFO buffer of the present invention.

FIG. 2 is a block diagram illustrating the terminal circuitry. The terminal circuitry includes two basic circuit boards. One contains the terminal processor 40. The other, known as the video generator circuitry, contains the video memory circuitry 50, character generator circuitry 60, and CRT deflection circuitry 70.

The terminal processor circuitry 40 in FIG. 2 comprises the terminal microprocessor (MPU) 110, read only memory (ROM) 112, random access memory (RAM) 114, direct memory access (DMA) controller 106, interrupt controller 108, and four serial input/output ports, namely serial I/O port A (120), port B (124), port C (104), and port KSIO (116). I/O port KSIO communicates with keyboard 118. Port A controls a serial printer 122. Port B may control an optional serial device such as a badge reader, optical character reader, ticket printer, touch screen, mouse, etc. Port C is used to couple the terminal circuitry to the central system. Either an RS-423 interface 101 or a coaxial cable interface 102 may be selected by means of switch 103.

The terminal processor 110 is a Z80-based microprocessor and provides interfaces to the printer 122, to the keyboard 118, and to the display's video RAM memory 88. The terminal processor 110 also provides the intelligence and memory needed to buffer, check, and process data and commands sent to or from the LVC.

Serial I/O port C (104) is operated in a half duplex synchronous byte oriented mode. It generates an interrupt at the beginning of each message frame. The MPU 110 programs a DMA transfer to the processor RAM input buffer, and at the end of this transfer, the DMA interrupts and the MPU checks for transmission errors (CRC). At this time, if the CRC was good and the terminal has been polled for input, the XDMA (transmit DMA) channel and port C are used to transmit an input message to the LVC. When port C interrupts upon completion of the input message transmission, the MPU reprograms port C to interrupt at the beginning of the next output message frame.

While the next output frame is being DMA'd to the next frame buffer, the MPU 110 processes the previous frame if its CRC was good and the message header indicates that the message was destined for this terminal. If the message contained video data, a VDMA (video DMA) transfer is started from the frame buffer to update the video RAM 88. If the message was a terminal command, it is processed by the MPU. If the message contained data for the printer, a PDMA (printer DMA) transfer is started from the frame buffer to the printer's I/O port 120.

Keyboard inputs arrive via port KSIO, which is programmed to operate in a low speed asynchronous mode. Printer status information causes an interrupt from I/O port KSIO. The terminal firmware may also generate status messages. Keystrokes and status messages are merged and buffered for later transmission by the XDMA channel and port C.

The RAM 114 is used to hold the downloaded firmware used in normal operation and for optional peripherals. The RAM also provides temporary storage for stack and other variables, video channel communications buffers, command buffers, and control tables.

The ROM 112 contains self-test diagnostics which are run every time that the terminal is powered up, or upon request by the user. The ROM 112 also contains bootstrap routines which are used to download the terminal software package, or any other desired software package (such as a CP/M operating system) into the RAM 114. Once the RAM 114 has been downloaded, almost all of the software operates out of the RAM 114.

The DMA controller 106 has four channels. Two channels are used to support the port C COAX interface option. The third DMA channel is used to support video, disk, line printer, or voice data transfers. The last DMA channel is used to support port A or port B transfers (typically, a serial printer on port A).

In a preferred embodiment, the DMA is an AMD 9517A-4 DMA chip.

TERMINAL VIDEO GENERATOR CIRCUITRY

Still with reference to FIG. 2, the terminal video generator circuitry is contained on one circuit board and includes three basic parts—video memory 50, character generator 60, and the CRT deflection circuits 70. The three parts communicate with one another via the terminal data bus 11 and the video timing bus 16.

Video memory 50 includes a video memory controller 80, a display controller 82, a 2:1 multiplexer 83, a word/byte demultiplexer 84, a video data register 86 which in a preferred embodiment takes the form of a first-in/first-out (FIFO) register, the video RAM's 88, and display data registers 90.

The character generator circuitry includes video timing clocks 92 whose outputs are distributed to the various other circuit blocks as required, a field attribute decoder 93, character register 94, attribute register 95, character downloader 97, character generator RAM 96, character generator 98, and attribute generator 99.

The CRT deflection circuitry includes sweep circuits 130, deflection and high voltage (HV) circuit 132, cathode drive circuitry 134, and the cathode ray tube (CRT) display 136.

Still referring to FIG. 2, the video memory controller (VMC) 80 and FIFO register 86 communicate with the terminal data bus 11 to get character data to be displayed on the CRT display 136, load it into the video memory 88, and send it to the video character generator circuitry 60 and CRT deflection circuitry 70. The video character generator circuitry takes the character data coming over the character data bus 91 and generates the desired dot pattern to form the particular character. Different character sets are possible, so that any given character can be represented on the screen in different fonts. In addition, the video character generator circuitry includes attribute circuitry which imposes any of several desired attributes on the character, such as reverse video, blinking video, intensified video, etc.

The video memory 88 contains the ASCII (or modified or extended ASCII) codes and attribute information for data to be displayed on the screen.

The character downloader 97 enables a complete character set to be downloaded from the terminal data bus 11 into the character generator RAM 96. New character sets may be downloaded at any time at the user's option. The character generator RAM 96 contains the bits that define the dot patterns for characters to be displayed on the CRT display 136. In the absence of any attributes that might modify the displayed dots, a one is stored in the character generator RAM 96 for a visible dot, and a zero is stored for no dot.

The field attribute decoder 93 decodes that portion of the character word specifying the attributes, and the attribute generator 99 applies the corresponding attributes to the character dot pattern read out of the character generator RAM 96.

The progress of character data from the central processor 2 through the terminal to the display screen will now be described. When a message of display information is received by the terminal, it is stored into RAM 114 by the terminal MPU 110. When the message has been validated, it is sent to the video RAM 88. Certain commands are sent to the VMC 80 and FIFO 86, setting up the operation, and a DMA operation to the FIFO 86 is initiated. The FIFO 86 buffers the data and grabs video RAM 88 cycles during retrace blanking to feed the data into the video RAM 88. The size of FIFO 86 (three 24-bit words) is designed to be sufficient to keep up with the data flow while only operating during the video retrace times. Other operations are also supported at retrace time, such as moving video memory data to and from FIFO 86 for vertical scrolling, and accessing selected characters to and from the video RAM 88 via FIFO 86 for implementation of a blinking cursor character.

The addresses for the loading of the video RAM 88 are generated by the VMC 80, as are the addresses for reading the video RAM 88. At display data times (i.e., times other than horizontal and vertical retrace blanking) 24-bit video display character words are read out of the video RAM 88 at a rate of several per microsecond, with the exact rate determined by the size and shape of the screen. These characters are fed to the character generator circuitry 60 to be checked for parity and to get the attributes, and to determine the video display character. Addresses are input into the character generator (CG) RAM 96 memory, which contains display character information formatted to generate 16 display scan lines each 9 bits wide. The CG RAM 96 is organized as 9×16K plus parity. The 14 to 16 bits for addressing this memory array come 8 bits from the character value in the display character word, 2 to 4 bits from the character set (also from the display character word), and 4 bits from a CRT5037 video timer and controller chip (described below) for the one of sixteen scan lines. These bits are multiplexed together and used to address the CG RAM 96 to read the 9-bit display character scan line, which is sent to the character generator 98. At the same time, the field attribute decoder 93 will have determined which attributes are to be applied for this display character, which attribute signals interact with the display character in the appropriate manner before the data is sent to the CRT display 136.

The CRT5037 chip (150, FIGS. 4A and 10B) is commercially available from Solid State Scientific and supplies vertical and horizontal sync and retrace blanking plus the memory scan for the Video RAM 88. The CRT5037 chip is used to generate the necessary display signals to the whole system. The chip is programmable to give variable screen sizes and display signals. The scan lines (DL0–DLC3) go to the DLC2 chip to select one of sixteen character scan lines in the CG RAM 96 and to the VAD chip to be used in the underscore logic. The column and row address lines (H0–H7, DR0–DR4) after being delayed by two CCLK cycles in the VMC 80 become address lines to the Video RAM 80. During display time, the column address increments once per character clock. If the screen size is programmed for more than 32 rows, then the logic inside the VMC 80 will provide the MSB for the row address (DR5).

The HSYNC signal goes through the register delay chain inside the VAD chip. The signal, at proper timing delay taps, controls the download controller of the CG RAM 96 and the horizontal retrace of the CRT deflection circuits 70. The VBLANK signal goes the the VMC 80 and goes to the VAD chip where it is used in the prepared attribute logic; the signal after being delayed by the register chain inside the VAD is also used to control the operations of the download controller. The VSYNC signal is used by the VMC 80 to reset the logic to generate the MSB of the row address; being delayed by 6 CCLK cycles inside the VAD chip and 1 more outside, the signal gets to the CRT deflection circuit 70 to trigger the vertical retrace.

The Z80A-CTC chip (250, FIG. 4B) handles all interrupt processing. The DLC1 and VMC chips have wire-ORed interrupt request lines to the CTC which they pull in the event of requiring an interrupt. The CTC chip also provides blink rate to the video attribute decoder (93, FIG. 4B). The video generator circuitry uses all 4 channels of the CTC Z80A chip. The channel assignments are as follows:

CHANNEL 0: (port address=80; read and write). This channel is programmed to generate an interrupt when the TRANSFER COUNT ZERO signal is activated. This channel operates in a counter mode with a falling edge trigger. The time constant word=1.

CHANNEL 1: (port address=81; read and write). This channel can be used as a real time clock interrupt. Its output is the trigger source to channel 2. This channel operates in a timer mode, with an automatic trigger when the time constant is loaded.

CHANNEL 2: (port address=82; read and write.) This channel and channel 1 determine the blink rate of the blinking characters on the screen. To get the correct blink rate channel 1 should be programmed as described above, and channel 2 should be programmed to counter mode, with a rising edge trigger.

The approximate blink rate is determined by the equation:

Blink Rate = $2 \times Phi \times P1 \times T1 \times T2$ where:
Blink Rate is the time interval the blinking character appears or disappears on the screen (50/50 duty cycle);
Phi is the Z80A system clock period;
P1 is the prescaler factor in channel 1;
T1 is the time constant of channel 1; and
T2 is the time constant of channel 2.

CHANNEL 3: (port address=83; read and write). This channel is programmed to generate an interrupt when the parity checkers detect error(s) in the video RAM 88 or CG RAM 46. This channel operates in counter mode, with a falling edge trigger, and its time constant register=1.

Figure 5:
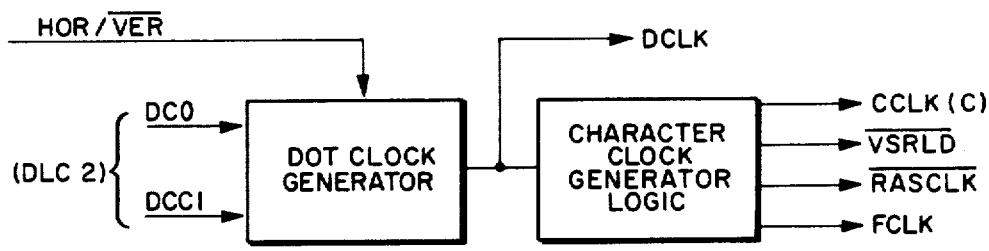
FIG. 5 is a block diagram illustrating clock generator logic utilized in the terminal video generator circuitry shown in FIGS. 4A and 4B.
Figure 4A:
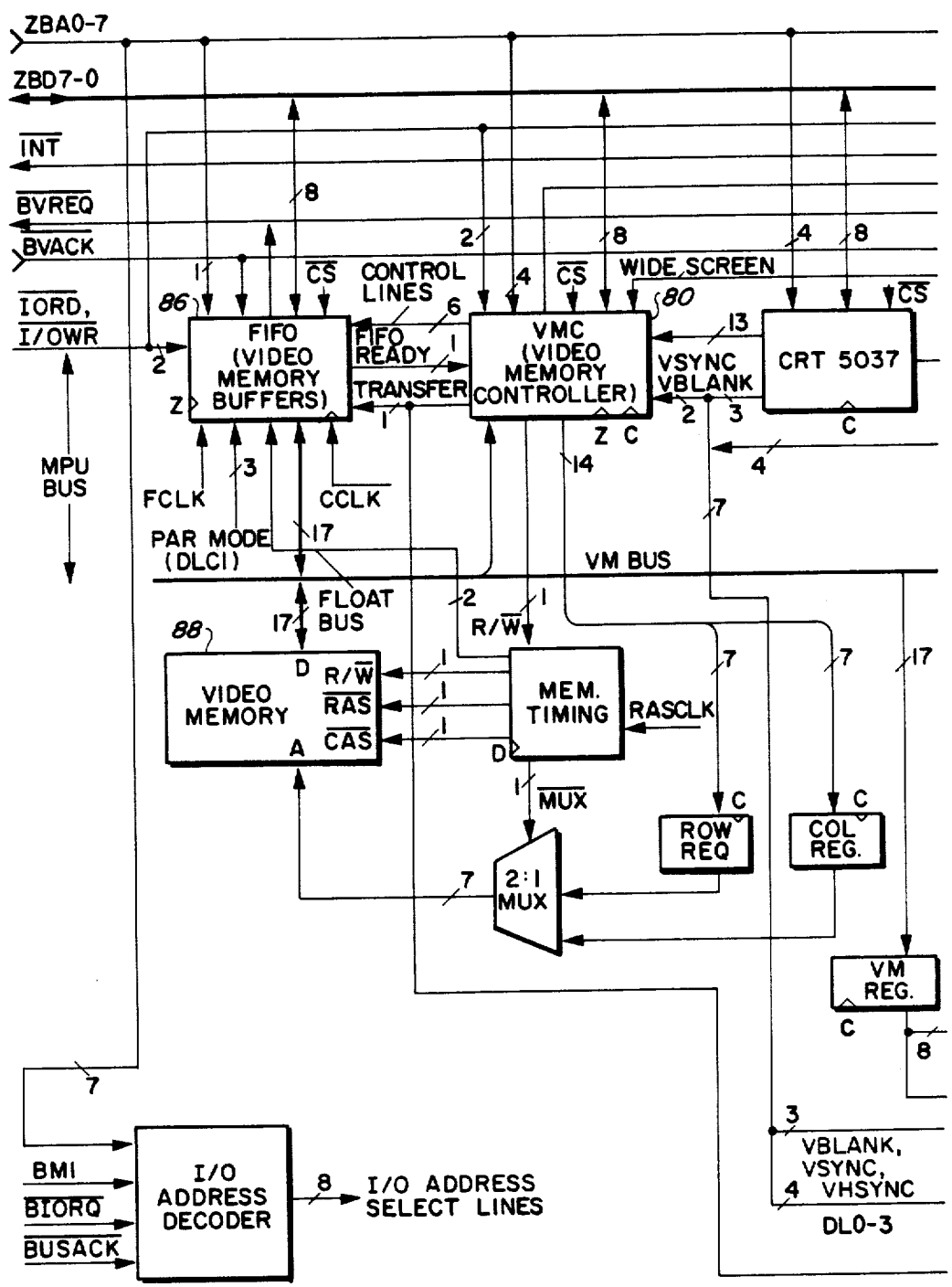
FIGS. 4A and 4B are a detailed block diagram illustrating the overall terminal video generator circuitry, including the video update FIFO buffer of the present invention.
Figure 4B:
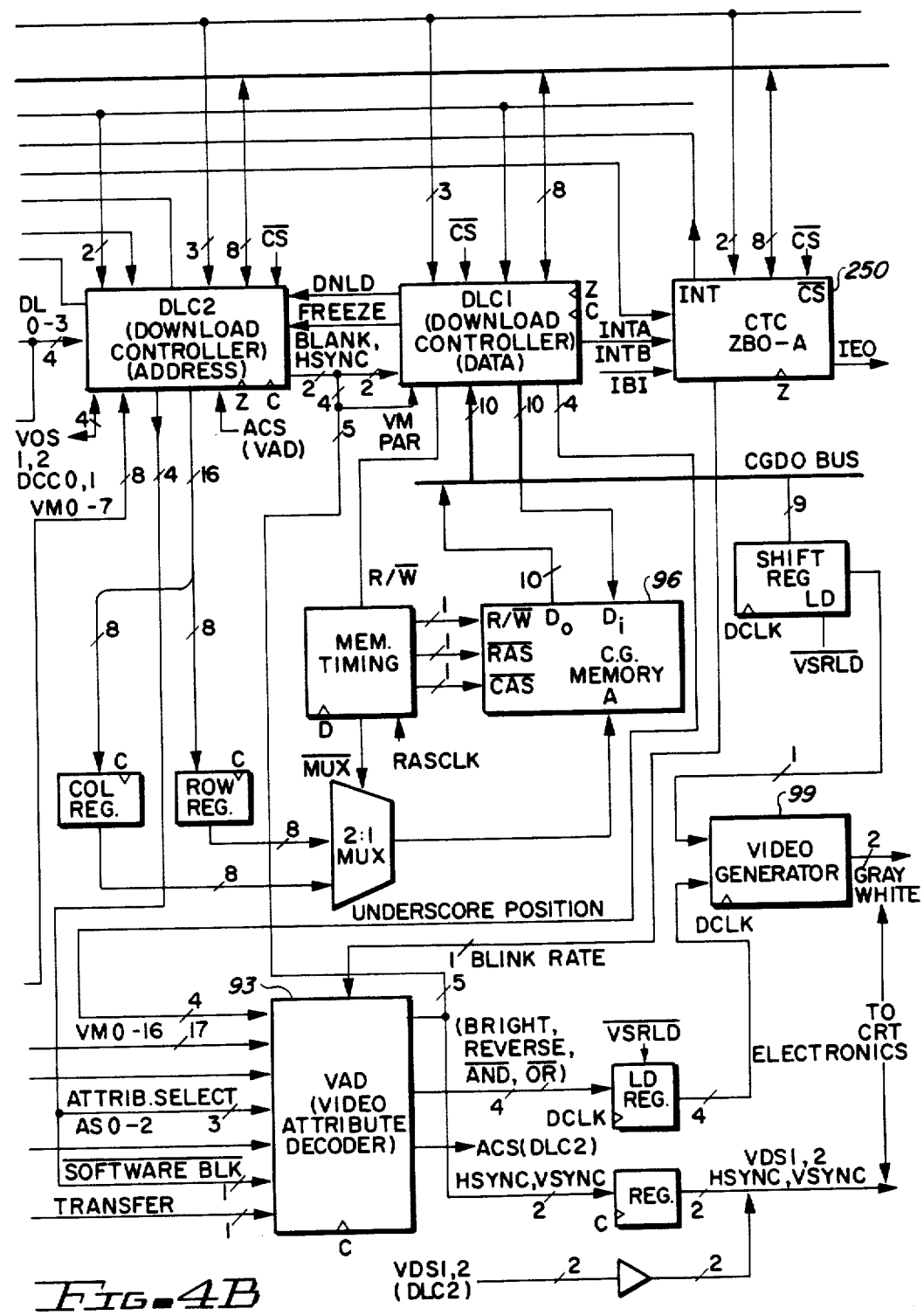

FIGS. 4A and 4B are a more detailed block diagram than FIG. 3, illustrating the overall terminal video generator circuitry, including the video memory controller 80 of the present invention. FIG. 5 is a block diagram illustrating clock generator logic utilized in the terminal video generator circuitry shown in FIGS. 4A and 4B.

TERMINAL VIDEO MEMORY CIRCUITRY

The video RAM 88 comprises a two port video RAM, wide enough for both character and attribute information. The memory addresses are mapped so that they can be addressed in two dimensions (row, column).

A cursor detector circuit monitors a cursor location bit of the FIFO register 86 during video memory controller 80 write cycles. If the bit is set, the cursor address (row, column) is saved in two registers. The MPU 110 can read these registers at the end of a segment update to learn the cursor position. The MPU 110 is responsible for substituting the cursor character and replacing the character "behind" the cursor at the cursor blink rate.

During character display times, the display controller 82 accesses RAM 88 and reads out a character in one memory cycle into the display data registers 90. The display controller 82 also generates the raster scan horizontal and vertical sync and blanking signals which are sent to the character generator circuit 60. The video RAM 88 runs at the character clock rate (provided by the character generator circuit 60) except for the word-/byte demultiplexer 84 and the input portion of the video memory controller 80, which both run at the terminal processor clock rate.

During horizontal and vertical retrace times, the video memory controller 80 has access to the video RAM (VRAM). The video memory controller 80 transfers blocks of data in column order from the VDMA channel to the VRAM 88 or from the VRAM to the VDMA channel. These transfers occur via the FIFO register 86 and the word/byte demultiplexer 84. The video memory controller 80 may be programmed to start updates in any column of a row and to transfer any number of columns within a row. The number of columns is usually set equal to the segment width (i.e., updates and scrolls are done on a segment basis). An interrupt is generated at the end of each block to request reprogramming of the video memory controller 80. A VDMA to VRAM transfer is used for screen updates, VRAM to VRAM transfers for the scroll command, and a VRAM to VDMA transfer for diagnostic purposes.

The first and third types of transfer use the VDMA channel (normally) or may be accomplished directly by MPU I/O instructions. Two modes are provided for transfers to or from the MPU data bus: 8 bit or 24 bit. In 8 bit mode, the word/byte demultiplexer is disabled and each byte goes to or comes from successive columns in the VRAM. For 24 bit mode VDMA to VRAM transfers, the video memory controller 80 and the word/byte demultiplexer 84 first assemble a 24 bit word out of 3 successive bytes (first byte is most significant); then the video memory controller 80 transfers the entire word to one character location in the VRAM 88. The process is repeated, loading 3 byte words into successive columns. A reverse (disassembly) process occurs for 24 bit mode VRAM to VDMA transfers.

The scroll (VRAM to VRAM) transfer requires four character times per character, occurs on the video data register bus 91, and is isolated from the terminal data bus 11, allowing the MPU 110 to operate at full speed. The scroll function uses the FIFO register 86 to hold the character read from the old row until the next update cycle may be used to copy the character into the same column in the new row.

Figure 7:
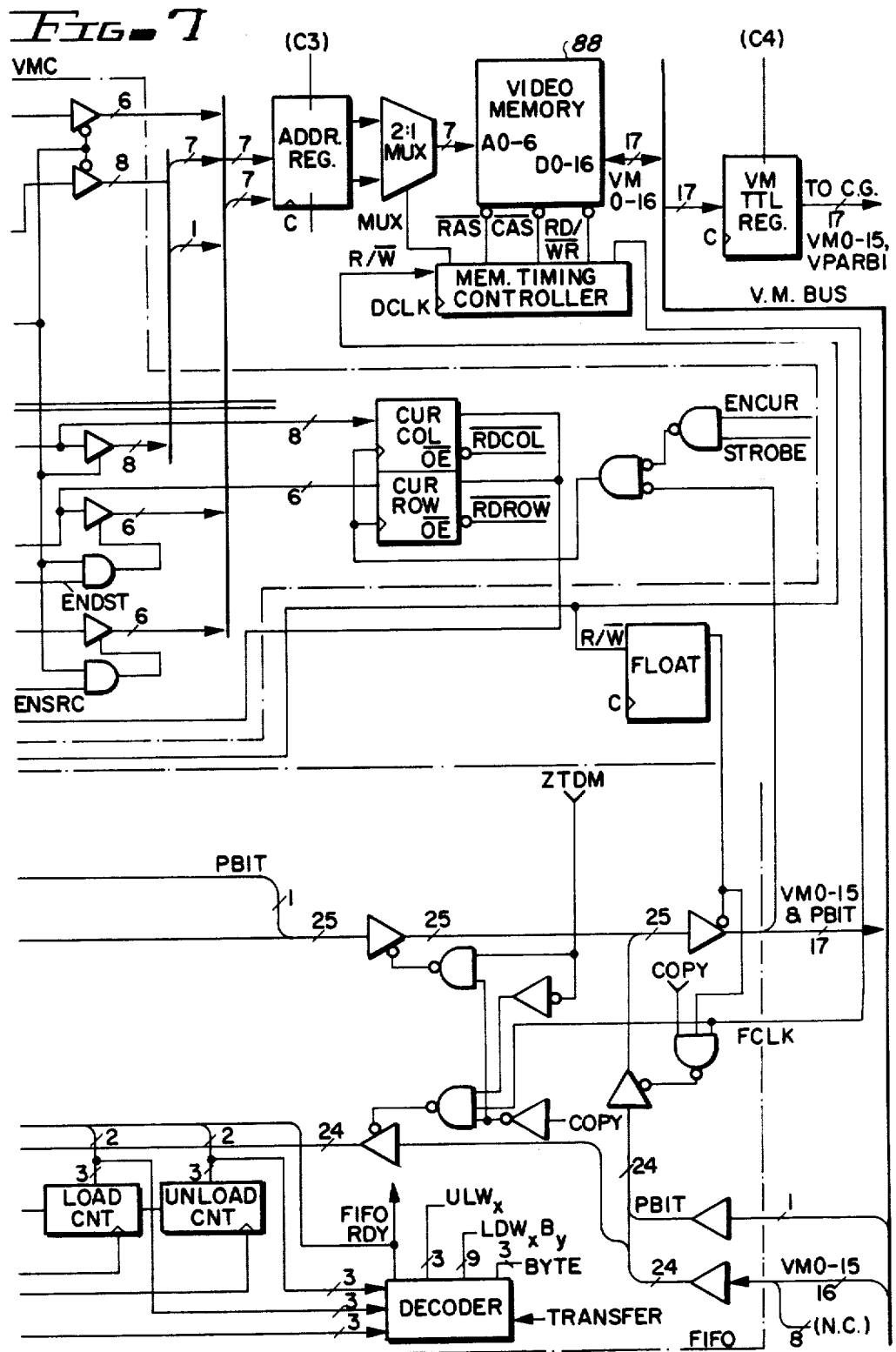

FIGS. 6 and 7 are a detailed block diagram illustrating the terminal video memory circuitry, including the video memory controller logic and the FIFO logic.

TERMINAL CHARACTER GENERATOR CIRCUITRY

The character generator 60 contains an 8K by 9 bit memory 96 large enough to contain the dot matrix definitions for two programmable character sets of 256 characters each. Each character is 9 dots wide and may be up to 16 dots high. The dot matrix definition may be written into the character generator RAM 96 by either MPU I/O instructions or by DMA transfers. The MPU 110 loads a standard default character set into both RAM character sets at power on time. The default set is stored in the processor ROM 112.

The character generator 60 also decodes and generates character attributes. Other functions include the generation of the character and dot rate clocks, as well as resynchronization of the video memory's sync and blanking signals.

The video memory 88 sends a new character to the character generator 60 once per character clock. In 8 bit mode, bits 0 through 7 are sent to both the character register 94 and the field attribute decoder 93. If the code received is a field attribute code or a field attribute cursor, the decoder will make a change in the attribute register 95. Blanks are loaded into the character generator RAM 96 for all attribute codes. If the code received is a character, no change is made in the attribute register.

In 24 bit mode, bits 0 through 7 are sent to the character register 94 and the remaining attribute bits are loaded directly into the attribute register 95.

The character generator RAM address is composed of the character register contents (character code), the character set select attribute bit from the attribute register 95 and the current scan line (part of the video timing information from the video memory 88). The character generator 98 is a shift register which is loaded with the 9 dots from the character generator RAM 96. These bits are shifted out at the dot clock rate and modified by the attribute generator 99 according to the bits in the attribute register.

The attribute generator 99 is capable of blinking, blanking, underlining, generating field attribute cursors, and generating intensified and reversed characters. The attribute generator sends 2 bits of video data per dot clock to the CRT driver electronics 70.

Downloading of new character sets is accomplished by the character downloader interface 97 to the terminal data bus 11. This interface assembles 18 bit pairs of scan lines out of 3 bytes and also generates the correct download addresses and timing signals for writing into or reading from (for diagnostics) the character generator RAM 96. The download addresses are generated by scan line and character code counters. The starting character code may be preset to any number, and any number of characters may be loaded. A one bit I/O port on the terminal data bus 11 selects the character set which is being downloaded.

In eight bit character mode, all character codes are eight bits wide, packed three to a word.

| 0 1 2 3 4 5 6 7 | 8 9 10 11 12 13 14 15 | 16 17 18 19 20 21 22 23 |
|---|---|---|
| first character | second character | third character |

Only one screen segment is allowed in 8 bit character mode.

All cursor flashing and movement in the 8 bit character mode must be performed by software substitution of cursor symbols for characters in the video area in the video memory 88. These changes are picked up by the LVC's change detector and sent to the terminal, just like any other character changes.

All attribute codes take up a character position on the screen. Attributes are applied on a field basis (i.e., they remain in effect until another attribute code is scanned later in the character stream; the second code then completely overrides the previous field attribute code).

In twenty-four bit character mode, each character occupies a word of video memory 88 and has its attributes directly encoded within the word on a per-character basis. There are no field attributes. All other video features are supported in the 24 bit mode, including segmentation and vertical scrolling of segments.

There is only one standard attribute encoding system in 24 bit mode; the terminal responds to 17 of the 24 bits. The terminal uses these fields:

| 0 1 2 3 4 5 6 7 | 8 9 10 11 | 12 13 | 14 | 15 | 16 | 17 | 18 19 | 20 21 22 23 |
|---|---|---|---|---|---|---|---|---|
| character code | char set | Y Z | US | BL | CP | RR | SWA | RR | where the character set selection field is bits 8 through 11, right justified, with bit 8 most significant. Y and Z are the intensity code, coded as follows:

| Y | Z | Attribute |
|---|---|---|
| 0 | 0 | Low Intensity |
| 0 | 1 | Reversed Video |
| 1 | 0 | High Intensity |
| 1 | 1 | Invisible Character |

US is the underscore attribute when set; BL is the blinking attribute when set; CP, when set, indicates to the terminal cursor detector hardware that this character is at the cursor position (the character position will be recorded by the cursor detector for use by the software in its 24 bit mode). RR indicates a reserved hardware field; such field should be set to all zeros. SWA indicates a field reserved for software attributes. Attributes are only in effect for the current character.

In 24 bit character mode, each segment may have its own cursor. The cursor position is indicated by bit 16 of the 24 bit character word. Only one cursor is permitted per segment. The cursor's appearance (character, attributes, blink rate, and blink duty cycle) may be controlled on a per-segment basis using the DEFINE SEGMENT, REDEFINE CURSOR, DISABLE, and ENABLE CURSOR commands. The cursor alternates with the character "behind" the cursor according to the blink on and blink off times programmed in these commands. The cursor character may be any displayable character previously loaded into the programmable character generator RAM. Attributes may be applied to the cursor character. In order to increase cursor visibility, there is a reset of the cursor blink cycle (cursor is forced on) whenever the cursor is moved.

Figure 10A:
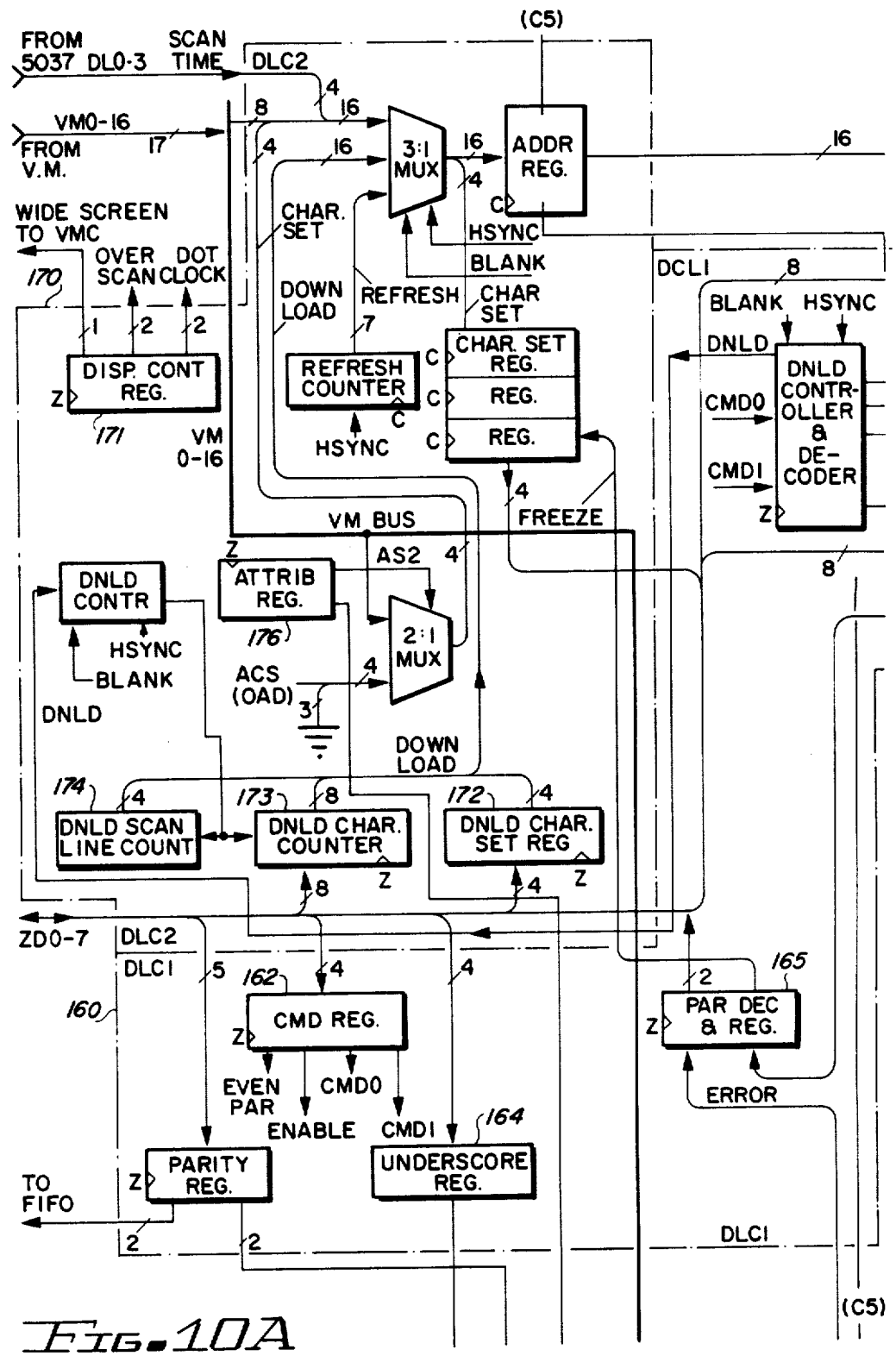
Figure 10C:
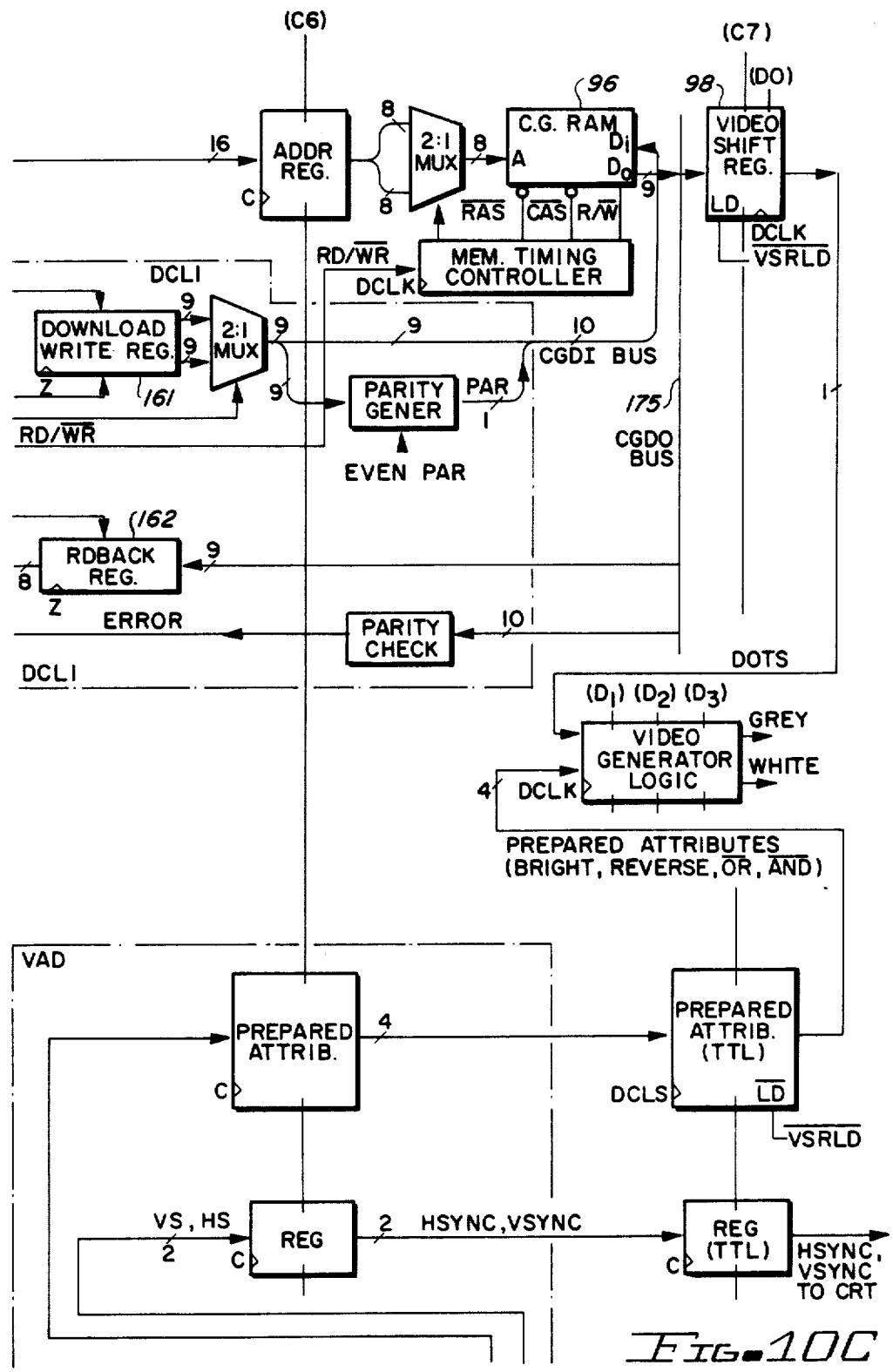

FIGS. 10A, 10B, and 10C are a detailed block diagram illustrating the terminal character generator logic. In FIGS. 10A-10C, the symbol "C" designates the character clock; all registers responsive to the "Z" clock are read or written by MPU I/O or DMA read or write commands; C0, C1, C2, and C3 are in the video memory logic; and D1, D2, and D3 are different levels of dot clock delay.

FIGS. 10A-10C show, inter alia, character downloader controller circuits DLC1 (160) and DLC2 (170), the video attribute decoder circuit VAD (180), the CRTC5037 video controller chip 150, and the character generator RAM 96.

The VAD 180 performs the decoding and controls the application of video attributes. The DLC2 170 accepts the display data characters and routes them to the CG RAM 96 as read addresses for generation of the video display dots that form the characters on the screen. The DLC1 160 interacts with the terminal data bus 11 to get display character information to load the CG RAM 96. The CRT5037 150 supplies vertical and horizontal sync and retrace blanking plus the memory scan for the video RAM's 88.

Since it is rather difficult to separately describe the operations of the DLC1 and DLC2, in the following discussions they are collectively referred to as the down-load controller, and their operations are explained together.

For the function of placing display information on the video screen at display time, the CG RAM 96 is read using the display characters from video memory 88 as addresses. This information is sent from video memory 88 to the DLC2 chip to produce the addresses for the display scans to the CG RAM 96. The data fetched from CG RAM 96 is the character display bits that are sent to CRT deflection circuits 70. Parity is checked on this operation. Also, during video retrace blanking time, the DLC circuits perform other functions, including memory refresh and the down-line loading of the CG RAM 96. Parity is generated during the down-line load operation on the data sent to CG RAM 96.

The CG RAM 96 is made of dynamic RAM parts and needs to be refreshed. This function is performed by a counter in the DLC2 chip. Refresh addresses are sent to the CG RAM 96 by DLC2 during horizontal sync pulses.

The DLC chips contain various registers that contain status and control information for various functions, including their own and other video generator circuits. Some registers are on DLC1, others on DLC2, some on both chips. Some registers are read only, others write only, and each register has its own port address with the exception that some registers share an address, being differentiated by being a read or write register or by the use of different chip select signals. The down-load data port 161,162 is accessed as if it were a read/write register, although it is also accessed as a DMA data port.

The download character set register 172 is write only and selects which of sixteen character sets is being accessed by the terminal processor 110. Its four bits are used as the most significant bits of the CG RAM 96 address.

The download character counter register 173 is write only and contains eight bits pointing to a sixteen word block in CG RAM 96. The dot information for a character is stored in sixteen lines of nine bits.

The download command register 162 is write only and bits 0 and 1 are encoded as follows:

| BIT1 | BIT0 | FUNCTION |
|---|---|---|
| 0 | 0 | Disable: DLC1 disables its VREQ output and awaits further command |
| 0 | 1 | Reset: Same as Disable but DLC2 resets its scan line counter 174. |
| 1 | 0 | Down-Load: DLC1 requests 3 bytes from MPU, then writes 2 words to CG RAM 96. Addresses come from DLC2 registers. |
| 1 | 1 | Read-Back: DLC1 reads 2 words from CG RAM 96 and writes 3 bytes to the MPU 110. Addresses come from DLC2 registers. |

Bit 2 is the DMA enable. If set, the DLC chips will respond to DMA handshake signals and will request DMA transfers from the terminal MPU 110. When bit 2 is reset, the DLC will be disabled and will not generate requests or respond to DMA handshakes, allowing the terminal MPU 110 to engage in DMA transfers with other elements on the DMA bus.

The down-load data port 161,162 is read/write and is the data interface between the terminal RAM 114 and the CG RAM 96. It can be written or read by the MPU through I/O instructions or by the video DMA channel. When the CG RAM 96 is being updated, three bytes are transferred from the terminal RAM 114 to the down-load data port. The data is partitioned into two nine-bit words. A parity bit is added to each, and the resulting 10 bit words are written into memory 96 via the CG DO bus 175. The diagnostic readback function works the same in the other direction, with two words being read and three bytes written to the terminal RAM 114.

The display control register 171 is write only and contains various control bits for the display. Bit assignments are:

| Bits | Meaning |
|---|---|
| 0,1 | Dot clock. Used to control the video clock generator. |
| 2 | Wide screen. It is 1 when screen is 96 or 132 columns wide horizontally; it is 0 when vertical or screen is 48 or 81 characters wide horizontally. |
| 4,5 | Vertical overscan. Used to control character height. |

The parity decode register 163 is write only and controls parity checking on the video and CG RAM's. Bit assignments are:

| Bit | Meaning |
|---|---|
| 0,1 | Control which bits are parity checked in video RAM. To FIFO only. Values:<br>00 = 0–7 only.<br>01 = 0–7, 10–15<br>10 = 0–15<br>11 = 0–15, 20–23 |
| 2 | =1, Disable parity check on display reads. To VAD 180 and used in DLC1. |
| 3 | =1, Disable parity check on readback. To VAD 180 and used in DLC1. |
| 4 | =1, Generate even parity (diagnostic only). To FIFO 86 and used in DLC1. |

The attribute register 176 is write only and selects the attribute system. Its contents are sent to VAD 180.

The underscore register 164 is write only. The underscore attribute (a single horizontal line) may appear on any line of the display character. This four-bit register selects the position, placed in bits 0–3. The bits are sent to the VAD 180.

The DLC1 and DLC2 chips provide the interface between the terminal/MPU DMA bus 11 and the CG RAM 96. All address transfers to the CG RAM 96 come through the DLC2, and data transfers come through DLC1. This is true whether they are from the terminal MPU 110 or the video RAM 88. These transfers are of two kinds: (1) writes (and diagnostic reads) of character sets from the terminal MPU 110, ad (2) display character reads with addresses generated in DLC2 from data character information from the video RAM 88 and scan line information from the CRT5037 controller. The DLC2 also performs refresh of the CG RAM 96. The DLC1 performs parity generation and checking for certain of the operations.

The VAD accepts the 24-bit display character and other attribute information (including blanking) and generates 4 bits of decoded attribute information for the CRT deflection circuits 70. The VAD performs the logic necessary to implement both field attributes and character attributes. In field attribute mode, various attribute character systems are supported, and logic to perform line and screen wraparound is supplied. Supported attributes are: normal, blank, bright, alternate character set, cursor, inverse, underline, and blink. In general, all attributes are supported in character attribute mode, and the field attribute modes support normal, blank, and bright only. The VAD also has circuitry to check the parity of the video RAM 88 during display and/or readback cycles.

VIDEO MEMORY CONTROLLER

Figure 8:
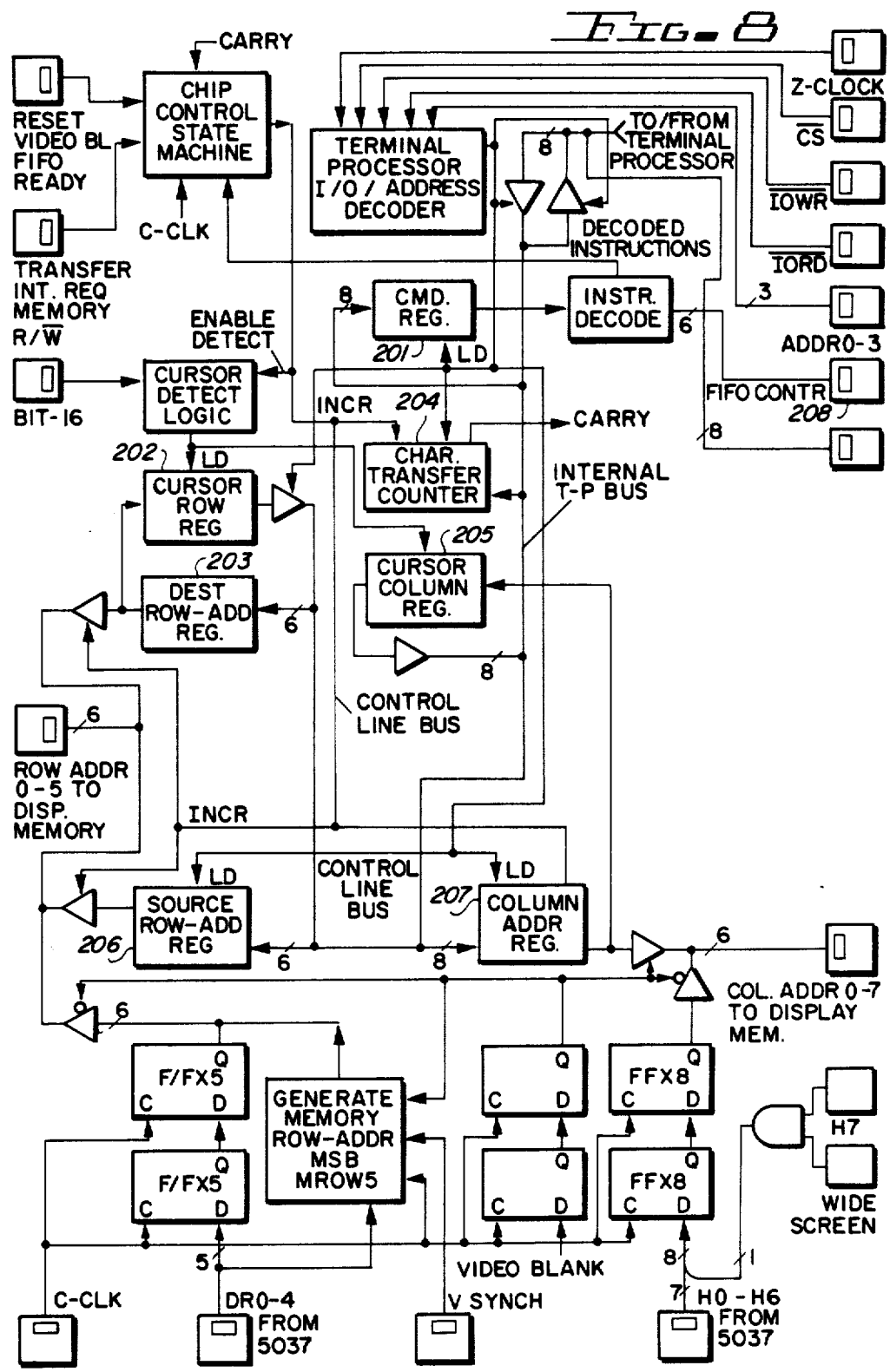
FIG. 8 is a detailed block diagram illustrating the video memory controller.

FIG. 8 is a detailed block diagram illustrating the video memory controller.

The video memory controller (VMC) 80 controls all data transfers between the terminal processor 110 and video RAM 88, and it also controls transfers within the video RAM 88 itself. Terminal processor transfers may be by either CPU I/O or DMA transfers. Basically, the VMC 80 provides the addresses and the FIFO 86 provides the data to the video RAM 88. The two chips are synchronized by two handshake signals: READY and TRANSFER. The READY signal is active when the FIFO is ready to send or receive data, and the TRANSFER pulse says that a transfer is being taken place. The TRANSFER pulse also goes to the VAD chip to enable the parity check circuitry. The VMC 80 controls the loading and reading of the video RAM 88.

During video retrace blanking periods, the display screen is not accessing the video and CG RAM's. At these intervals, updating or readback operations can be performed at character clock rate (controlled by the instruction register 201 in VMC 80). The RAM's are informed about blanking time by monitoring the video blanking signal from the CRT5037. The VMC 80 performs the addressing for video memory reads and writes, using addresses placed in its internal registers by the terminal MPU 110 and its internal counter logic.

When retrace is not taking place (no video blank signal from the CRT5037), the video RAM 88 is being read. The non-retrace period is also referred to as display time. During display time, the VMC 80 scans the video RAM 88, reading data out for the display using addresses furnished to the VMC 80 by te CRT5037. There is an exception for tall screen mode (vertically oriented screens taller than 32 rows) where one video memory address bit, representing row addresses above 32, is furnished by the VMC 80.

At any time, the terminal MPU 110 may access any of seven registers in the VMC 80. These registers are for controlling the video RAM 88 and all of the VMC's operations. Each register has a device address in the terminal MPU's I/O structure, and they are accessed via the Z-80 I/O instruction. Values are placed in all the registers except the CROW and CCOL are furnished by the VMC 80 when the cursor detect signal is asserted from the FIFO 86.

The VMC registers are as follows:

Command Register 201 (port address—8A; write only). This register controls the operations of the VMC.

| BIT: | MSB=7 | 6 | 5 | 4 | 3 | 2 | 1 | LSB=0 |
|---|---|---|---|---|---|---|---|---|
| Z80 BUS | ENADMA | CRFIFO | TCENA | CDENA | OP3 | OP2 | OP1 | OP0 | where:

ENADMA = Enable DMA: When bit 7 is set, the FIFO 86 will respond to DMA handshake signals and will request DMA transfers from the terminal processor 110. When bit 7 is reset, the FIFO 86 will be disabled, it will not generate requests or respond to DMA handshakes, and so the terminal processor 110 can engage in DMA transfers with other elements on the DMA bus.

CRFIFO = Clear FIFO: Each time a zero is written to bit 6, a one-shot clear pulse is sent to the FIFO 86. This pulse has the effect of resetting all of the FIFO's word counters to the top of the FIFO.

TCENA = Enable transfer-count zero detector 204 and interrupt: When bit 5 is set, any memory transfer operation (READ, WRITE, FILL, SCROLL) will be terminated by an overflow from the character-transfer counter (the counter is initially loaded with the one's complement of the desired count so that an overflow indicates remaining count equals zero). Also, an interrupt request pulse to the CTC (hence, to MPU 110) will be generated. When bit 5 is reset, any transfer operation will continue indefinitely for as long as there is any data at all to be transferred, and no interrupt request pulse will be generated. It is then up to the terminal processor 110 to halt the operation by writing a RESET to the command register 201.

CDENA = Cursor detector enable: During any series of writes to memory, the possibility exists that a cursor character might be written. In the 24-bit mode, a cursor character is indicated by bit 16 of the character word being set. The VMC 80 monitors this bit during block write transfers (eg, WR24ROW) to detect a cursor character. The detection of the cursors is controlled by the cursor detect enable (CDENA) bit, which is bit 4 in the command register 201. Cursor direction is reported by the cursor detect flag (CDF), which is bit 7 in the cursor row register 202. There are three possible states:

1. Looking for a cursor. Programming CDENA to change from 0 to 1 enables cursor detection. The CDF will go to 1 one clock pulse after the CDENA is set to 1, and it will stay at 1 until a cursor is detected.
2. Cursor found. When a cursor is detected, CDF will go to 0 and the cursor address will be loaded into the cursor row register 202 and cursor column register 205. Further cursor detection will be automatically disabled until the cursor detector is reset by the program.
3. Not looking for a cursor. The program can reset the cursor detector at any time by setting the CDENA bit to zero. Cursor detection will be disabled while CDENA = 0. Programming te CDENA bit to a 1 reenables the cursor to state 1 (above).

OP3-OP0=4-bit instruction code: In these 4 bits the nine instructions recognized by the VMC/FIFO pair are encoded. Defined values are:

| OP3 | OP2 | OP1 | OP0 | FUNCTION |
|-----|-----|-----|-----|----------|
| 0 | 0 | 0 | 0 | RESET |
| 0 | 0 | 0 | 1 | WR24ROW |
| 0 | 0 | 1 | 1 | WR8ROW |
| 0 | 1 | 0 | 0 | WR24REG |
| 0 | 1 | 0 | 1 | FILL |
| 1 | 0 | 0 | 1 | RD24ROW |
| 1 | 0 | 1 | 1 | RD8ROW |
| 1 | 1 | 0 | 0 | RD24REG |
| 1 | 1 | 1 | 1 | COPY |

RESET=VMC resets its internal state machine.

WR24ROW=24-bit row segment write. Any number of video RAM locations will be written, up to the length of a row. If TCENA (bit 5) is set, the number of locations written is determined by the value in the TC register 204 before the command is issued. If bit 5 is reset, the result of the incrementing of TC 204 is ignored, and the FIFO operation will continue until terminated by a RESET command from the terminal MPU 110. The first time the FIFO assembles 3 bytes into a word (first byte most significant, second next, third least), it asserts the FIFO Ready signal to the VMC 80. Each time 3 bytes are assembled into a word in the FIFO, the FIFO's internal counters are advanced. The presence of a cursor bit (bit 16) is tested also. When the FIFO goes full, it stops trying to read more data from the terminal MPU 110, until one of its words is read out to the video RAM 88 by commands from the VMC, at which time its internal counters are decremented. This takes place when one or more words is in the FIFO and video blanking from the CRT5037 is available (MPU access time), the addresses coming from the DST register 203 and COL register 207, and the FIFO's internal counters are decremented correspondingly. The COL counter 207 is incremented, and TC 204 is decremented. If TC204 has not gone to zero (or if bit 5=0), the VMC 80 will continue causing the FIFO to transfer its data to memory whenever it sees video blanking and FIFO ready signals.

WR8ROW=Requests 1 byte per video RAM location instead of 3. The byte is loaded into the MSB of the FIFO register 86 (the other 2 byte locations are unchanged), and the FIFO pointer is advanced. WR24REG can be used to establish the 16 low order bits of the word, if required for a FILL operation. Each time a byte is placed in the FIFO, the FIFO's internal counters are advanced. When one or more words is in the FIFO at MPU access time, the word or words will be written to the video RAM 88, the addresses coming from the DST and COL registers, and the FIFO's internal counters are decremented correspondingly. Every time a word is written to video RAM 88, the COL counter and TC are bumped. If TC has not gone to zero (or if bit 5=0), and FIFO ready is still true, another word is requested and the process repeats, until the FIFO goes empty or another finishing condition is reached. That is, if bit 5 of CMD is set, the number of locations written is determined by the value in the TC register 204 before the command is issued. If bit 5 is reset, the outcome of the incrementing of TC is ignored, and the FIFO operation will continue until terminated by a RESET command from the terminal MPU 110.

WR24REG=Load three bytes into the FIFO, first word most significant. The word is not transferred to the video RAM. For diagnostic or FILL operations.

FILL=The 24-bit value in the FIFO's output buffers is written into video RAM at the address indicated by DST and COL, the COL counter is incremented and the TC is decremented. If the TC has not gone to zero (or if TCENA of the CMD register=0), the operation repeats. If bit 5 of CMD=0, the FIFO will attempt to continue the operation until stopped by a RESET command from the terminal MPU. Before starting a FILL, it is appropriate to fill the output buffers using the WR24REG operation. FILL is useful for diagnostics, for blanking screens, and for drawing repetitive patterns such as borders.

RD24ROW=24 bit video RAM row segment read. If TCENA (bit 5)=1, as long as the TC remains nonzero, the video RAM is read from the address indicated by SRC and COL using the FIFO, a 24-bit word at a time, and 3 8-bit bytes are sent to the terminal MPU. The first byte comes from the left byte position, middle second, right third. The address for the memory read comes from the SRC and COL registers. The reads take place during MPU access time only. COL is incremented and TC is decremented for every word read from the video RAM, and the TC is tested for zero. Useful for video RAM diagnostics. If TCENA (bit 5)=0, the counting of TC is performed but its results are ignored and the FIFO/VMC system will attempt to continue the read operation indefinitely, until halted by a RESET command from the terminal MPU.

RD8ROW=8 bit video RAM row segment read. The same as the RD24ROW except that only the leftmost byte of each word is transferred, and the rest of the FIFO is ignored.

RD24REG=The FIFO's contents are transferred to the terminal MPU by I/O Read or DMA, as three 8-bit bytes, left byte, then middle, then right. No memory operation takes place.

COPY=Copy row segment. The contents of the current video RAM source location (determined by SRC and COL) are read out in one character time, and this word is written into the current video RAM destination location (determined by DST and COL) in the next character time. The COL address is incremented and TC is decremented; if TC has not reached zero (or if TCENA (bit 5)=0), the process is repeated. Repeated line by line copy operations may be used to scroll screen segments vertically. If TCENA (bit 5)=0, the counting of TC is ignored, and the FIFO will attempt to continue the copy operation indefinitely, until a RESET command is received from the terminal MPU.

COLUMN ADDRESS REGISTER 207 (port address=8C; write only) This register contains the address of the video RAM column that is to be read, written, copied, or filled. The column address register 207 is set up by the terminal MPU at the beginning of an operation, and the VMC increments this register after every transfer for WR24ROW, WR8ROW, FILL, RD24ROW, RD8ROW, and COPY commands. The left-most column on the screen is column 0. No overflow detection is done on this register; thus it is the responsibility of the terminal MPU to prevent row wrap-around.

```
BIT: MSB=7   6    5    4    3    2    1   LSB=0
Z80  | CA7 | CA6 | CA5 | CA4 | CA3 | CA4 | CA1 | CA0 |
BUS
```

CA7 = MSB; CA0 = LSB.

DESTINATION ROW ADDRESS REGISTER 203 (port address=8D; write only) This register contains the video RAM row address that is to be written into by a write, copy, or fill operation. This address is not changed by the VMC; the MPU will update it as needed. The top row of the screen is row 0; the bottom row is 11, 23, 32, 43, or 63, depending on the screen height.

```
BIT: MSB=7   6    5    4    3    2    1   LSB=0
Z80  |  X  |  X  |DRA5 |DRA4 |DRA3 |DRA2 |DRA1 |DRA0 |
BUS
```

X = Don't care

DRA5 = MSB; DRA0 = LSB.

SOURCE ROW ADDRESS REGISTER 206 (port address=8E; write only) This register contains the video RAM row address that will be read into the FIFO by a read or copy operation.

```
BIT: MSB=7   6    5    4    3    2    1   LSB=0
Z80  |  X  |  X  |SRA5 |SRA4 |SRA3 |SRA2 |SRA1 |SRA0 |
BUS
```

X = Don't care

SRA = MSB; SRA0 = LSB.

TRANSFER COUNT (TC) REGISTER 204 (port address=88; write only) This register is used to count the number of display characters transferred during a row update or readback operation. The register is preset to a positive number at the start of an operation by the MPU and decremented by one for each word transferred. When the register reaches zero, the VMC will generate an interrupt unless TCENA (bit 5) of the command register 201 is not set, in which case no action is taken.

```
BIT: MSB=7   6    5    4    3    2    1   LSB=0
Z80  | TC7 | TC6 | TC5 | TC4 | TC3 | TC4 | TC1 | TC0 |
BUS
```

TC7 = MSB; TC0 = LSB.

CURSOR COLUMN REGISTER 205 (port address=89; read only) This and the cursor row register 202 are part of the cursor detector logic. If the cursor detector is reset and then enabled (see the CDENA bit in the command register description above), and the cursor bit (bit 16 of the data word) is high during a video RAM write, the current video RAM row and column addresses will be loaded into the cursor row and cursor column registers, respectively. Bit 7 of the cursor row register (the cursor detected flag, CDF) will be set to 0, indicating a cursor detection. The terminal firmware can test this bit to find out whether a cursor character was loaded during the time that the cursor detector was enabled. Typically, the firmware will reset and enable the cursor detector before each row update and test the CDF after each row update.

```
BIT: MSB=7   6    5    4    3    2    1   LSB=0
Z80  |CCA7 |CCA6 |CCA5 |CCA4 |CCA3 |CCA2 |CCA1 |CCA0 |
BUS
```

CCA7 = MSB; CCA0 = LSB.

CURSOR ROW REGISTER 202 (port address=8B; read only)(For description, see cursor column register 205 above)

```
BIT: MSB=7   6    5    4    3    2    1   LSB=0
Z80  | CDF |  0  |CRA5 |CRA4 |CRA3 |CRA2 |CRA1 |CRA0 |
BUS
```

CDF = Cursor detected flag.

CRA5-CRA0 = Cursor row address; CRA5 = MSB.

FIFO CONTROL PORT 208 (port address=84; read and write) This port is used to address the FIFO data buffers during I/O transfers between the MPU and the FIFO.

```
BIT: MSB=7   6    5    4    3    2    1   LSB=0
Z80  |     |     |     |     |     |     |     |     |
BUS
```

Figure 12:
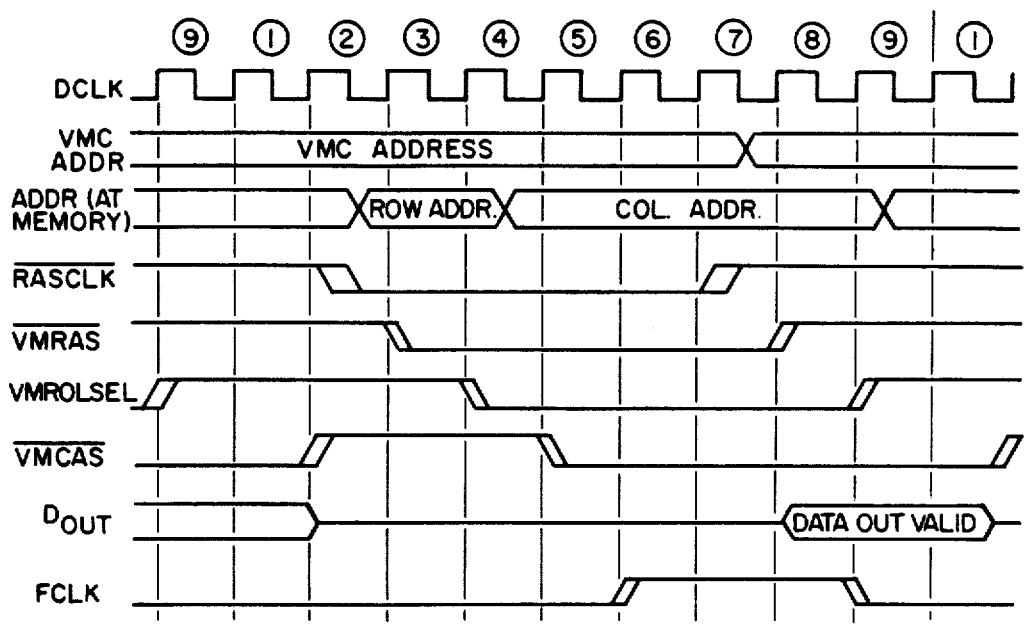
FIG. 12 is a timing diagram illustrating a video memory read operation.
Figure 13:
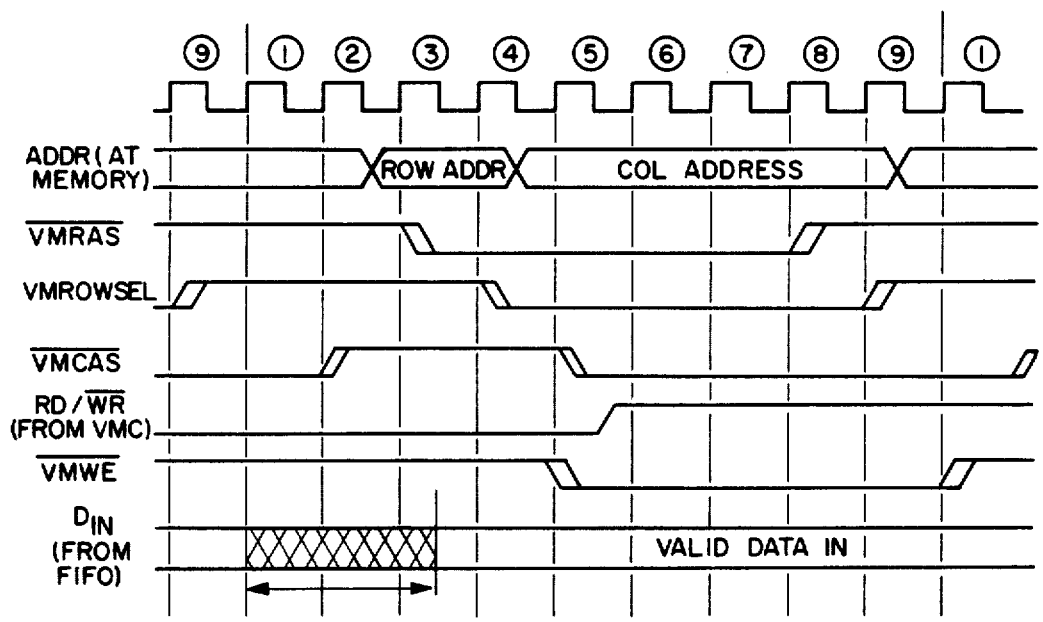
FIG. 13 is a timing diagram illustrating a video memory write operation.

Referring to FIGS. 12 and 13, all video RAM timings are based on the dot clock. The video RAM refresh is done during display cycles which scan the active rows of the video RAM (display columns).

The read cycles occur during display time, scrolling, or readback. The addresses come from the VMC and are latched in the VMC registers at the rising edge of the CCLK. A VMROWSEL signal is high at this time and selects the row address (display column) to the video RAM. −VMRAS is activated to strobe the stable address into the video RAM. After one dot clock the VMROWSEL signal goes low to select the column address. One dot clock later the −VMCAS signal goes low strobing the stable column address into the video RAM, and valid data will appear at the data output pins. The output data will be valid until −VMCAS goes high again.

The write mode only occurs during update cycles (Fill, Scroll, Write Memory). The row and column addresses come to the video RAM in the same manner as in the read mode discussed above. The only difference is that the VMRD/-WR signal from the VMC goes low at the same time the valid address leaves the chip. When there is a write cycle, the data output bus of the FIFO is enabled.

LVC COMMANDS

The LVC sends commands to the terminals in command blocks. Each command block is contained in one message frame. Command blocks are processed in the same order that they are sent and received. The LVC commands are outlined below according to type. Terminal Control:

The DOWNLOAD DEVICE command is used in the terminal initialization procedure and may also be used after initialization to add subdevice driver firmware or the download additional operating commands or features. The command points to a data block containing Z80 object code for the firmware to be downloaded. This data block is sent as a one-shot data block to the terminal and loaded as executable code.

The GET DEVICE TYPE command allows software to ask any channel device and its subdevices (if any) for their classes (terminal, printer, etc) and model numbers (or similar designation of available features). The device's reply is DMA'ed into a memory buffer.

The SET SCREEN SIZE command allows the height and width of the terminal display to be specified. Valid values for the horizontal terminal configuration are 12, 24, or 33 rows by 48, 81, 96 or 132 columns. Values for the vertical terminal are 12, 24, 33, 44 or 64 rows by 48, 81 or 96 columns.

The SET CHARACTER MODE command selects either the 8 or 24 bit character mode. This command also clears all segment definitions; it should be followed by one or more DEFINE SEGMENT commands. This command also selects the attribute system which will apply to the entire screen.

The SELECT KEYBOARD TYPE command allows selection of a numeric or function keypad and typewriter or keypunch mode shifting at the keyboard.

The BLANK/RESTORE DISPLAY command can be used to blank or unblank the screen, without interfering with video memory updates.

The ENABLE/DISABLE INPUT SUBDEVICE command controls transmission of inbound data from any terminal subdevice. Software may selectively enable/disable input subdevices.

Segment Control:

The DEFINE SEGMENT command positions the segment on the screen, informs the terminal of the segment size and shape, and selects the attribute family and the type of border displayed around the segment. Its parameters are:

DBN: The data block number will also be the segment number.

DB Width: The DB width must be equal to or greater than the segment width. A DB width of zero means no margin (DB width=segment width).

AF: Attribute family code for this segment.
  OH=none or field attributes
  1H=attribute family #1.

start row: The address of the screen row where the segment starts, not including any borders.

start col: The address of the leftmost screen column of the segment, not including any borders.

height: The number of rows−1 the segment is high, not including borders.

width: The number of columns−1 the segment is wide, not including borders.

border attributes: Defines the attributes of the border characters. Borders are optional.

cursor character/attributes: Any displayable 24 bit character which is to be used as the cursor. It will be alternated with the character "beneath" the character position (24 bit mode only).

cursor on/off rates: Define the rate and duty cycle of cursor flashing in 24 bit mode.

The CANCEL SEGMENT command is used to cancel the segment definition. An optional bit may select erasure of the segment data.

The SCROLL SEGMENT command initiates the vertical scroll of one segment. The parameters are the segment number, a signed integer which indicates the number of rows to be scrolled up or down, a pointer to the scroll data, and the length of the scroll data. The terminal scrolls the data in the video RAM for this segment by number of rows specified and updates the video RAM when the new data is received.

The REDEFINE BORDER command redefines the border attribute for a segment. The command is rejected if the original segment definition had no borders.

The REDEFINE CURSOR command changes the cursor character, attributes, and blink rate for the specified segment. If there was no cursor in the original segment definition, the cursor will be added.

The ENABLE/DISABLE CURSOR commands start and stop cursor blinking for a given segment.
Display Character Set Selection:

The DOWNLOAD CHARACTER SET RAM command loads a one-shot data block into all or part of a CG RAM character set (up to 256 characters). The DI (Done Interrupt request) may be used to inform software when it is safe to reassign the one-shot data block. The parameters are:

CS: Character set RAM to be loaded.

first character: The first character code (between 0 and FFH) in set CS to be loaded.

data block size: DBS/8 will determine the number of characters loaded. Fractions of characters may not be loaded. If the data block size overruns the end of the character set, the remaining data will be ignored.

The SELECT DEFAULT CHARACTER SET command loads the default character set from the terminal processor ROM into the specified character set (0 or 1). The terminal automatically initializes the default character set at power on.

Subdevice Control:

The TRANSMIT DATA BLOCK TO SUBDEVICE command sends a one-shot data block to the named subdevice. This command is designed for printers and other optional output subdevices.

The RESUME TRANSMISSION TO SUBDEVICE and FLUSH SUBDEVICE BUFFERS commands are used for TRANSMIT DATA BLOCK TO SUBDEVICE error recovery.

TERMINAL PROCESSOR SIGNALS AND BUS CYCLES

The terminal MPU 110, video memory controller 80, and any optional device controller share a common bus 11 controlled by the terminal processor board. The following signals are on the bus (+ indicates high active, − low active). X=external connection.

| Signal Name | Description |
| --- | --- |
| +BA15 to +BA0. | Buffered MPU/DMA address bus. A15 is most significant. |
| +BD7 to +BD0. | Buffered MPU data bus. D7 is most significant. |
| −MREQ. | MPU/DMA memory request. |
| −MEMR. | MPU/DMA memory read request. |
| −MEMW. | MPU/DMA memory write request. |
| −IORQ. | MPU I/O request or interrupt acknowledge. Not active for DMA I/O request. |
| −IOR. | MPU/DMA I/O read request or MPU memory read. Not active for DMA memory reads. |
| −IOW. | MPU/DMA I/O write request. Not active for MPU/DMA memory writes. |
| −M1. | MPU Instruction Fetch cycle. |
| −WAIT. | Peripheral request for slow bus cycle; MPU/DMA wait (wired-OR). |
| +ZCLK. | MPU master clock. |
| −NMI. | Non-maskable MPU interrupt request (wired-OR). |
| −INT. | Maskable MPU interrupt request (wired-OR). |

-continued

| Signal Name | Description |
|---|---|
| +IEO1. | Interrupt enable daisy chain (first link). |
| +IEO2. | Interrupt enable daisy chain (second link). |
| −EOP. | DMA end of process. |
| −VREQ. | VDMA request (wired-OR). May be used by options, too. |
| −VACK. | VDMA acknowledge. |
| LOMARGIN. | Selects −5% power supply margin (open collector). |
| −HIMARGIN. | Selects +5% power supply margin (open collector). |
| +KEYIN. | Keyboard input to terminal (RS-423). |
| +KEYOUT. | Terminal output to keyboard (RS-423). |
| +CABLE. | Transformer coupled video channel connection. |
| −CABLE. | Transformer coupled video channel connection. |
| −ALARM. | Sounds alarm (open collector). |
| −LED1,2,3,4. | Lights front panel LEDs (open collector). |
| +TA2 to +TA0. | Terminal polling address from backpanel switch. |
| −TEST. | From backpanel self test toggle switch. Causes terminal processor to reset the terminal. |
| +5V. | +5 volt logic supply. |
| +12V. | +12 volt logic supply. |
| −5V. | −5 volt logic supply. |
| −GND. | Common ground. |
| −RESET. | Power on/power fail reset from power supply to all logic cards (wired-OR, pullup at power supply). |
| +VRAM0 to +VRAM23. | Character data (only 14 bits used in this version). +VRAM0 is most significant. |
| +VHSYNC. | Horizontal sync signal from video memory. |
| +VVSYNC. | Vertical sync signal from video memory. |
| +VBLANK. | Blanking signal from video memory. |
| +DL3 to +DL0. | Display scan lines. DL3 is most significant. |
| +BLINK RATE. | Character blink rate. |
| +CCLK. | Character rate clock. |
| +GREY. | Low intensity video data. |
| +WHITE. | High intensity video data. |
| +GHSYNC. | Horizontal sync signal from the character generator. |
| +GVSYNC. | Vertical sync signal from the character generator. |
| +VOS1 and +VOS0. | Vertical overscan controls. +VOS1 most significant. |

There are eight types of bus cycles possible:
1. MPU Memory Read. Active control signals are −MREQ, −MEMR, −IOR.
2. MPU Instruction Fetch. −MREQ, −MEMR, −M1, −IOR.
3. MPU I/o Read. −IORQ, −IOR.
4. MPU I/O Write. −IORQ, −IOW.
5. MPU Interrupt Acknowledge. −INT, +IEO1, +IEO2, −IORQ, −M1. Highest priority interrupting device in daisy chain supplies an 8 bit vector on BD7-BD0.
6. MPU Return from Interrupt. −INT, +IEO1, +IEO2, −MEMR, −M1, −IOR. BD7-BD0 data bus is monitored by interrupting peripheral, watching for RETI op code. The −IOR signal is connected to the −RD pin of any interrupting Z80 peripherals and contains −MEMR as well as normal MPU/DMA IOR.
7. DMA I/O Read and Memory Write. −IOR, −MEMW, −MREQ, DMA channel acknowledge (−VACK on bus, or −XACK, −RACK, −PACK on terminal processor card), −EOP (last transfer only).
8. DMA I/O Write and Memory Read. −IOW, −MEMR, −MREQ, DMA channel acknowledge, −EOP (last transfer only).

VIDEO MEMORY READ AND WRITE OPERATIONS

Three types of video RAM read operations are provided: 24 bit VREG only (RD24REG), 24 bit VRAM row segment (RD24ROW), and 8 bit VRAM row segment (RD8ROW). All three may be either CPU I/O or VDMA reads. The VREQ bus signal is used to request DMA bus transfers from the VREG.

During a 24 bit read, the first byte is read from the most significant byte of VREG, the second byte from the middle of VREG, and the third byte from the least significant byte of VREG. If a further byte is read, it will come from the most significant byte, and so on.

The 24 bit VREG only read operation (RD24REG) does not alter the VREG, nor does it transfer any data from the VRAM. The VREQ bus signal is used to request three DMA byte transfers. This operation is automatically terminated after three bytes have been read from the VREG. This operation may be used for diagnostics along with the 24 bit write operation WR24ROW see above. Together, they can be used to verify the operation of the VREG and the VREG control logic. The psuedocode for the 24 bit VREG only read operation is:

| PROCEDURE RD24REG: |
|---|
| assert VREQ |
| read 1st byte from VREGH (msbyte of VREG) |
| read 2nd byte from VREGM (midbyte of VREG) |
| read 3rd byte from VREGL (lsbyte of VREG) |
| remove VREQ |
| END (wait for next command) |

The 24 bit VRAM row segment read (RD24ROW) is the same as the single location read, except that any number of VRAM columns may be read (in the same VRAM row). As long as TC does not equal zero, the update control will provide the DMA or CPU with VRAM data via the VREG, using the VREQ signal to request DMA transfers. This command is useful for VRAM diagnostics. The program must wait at least 10 T states after loading the command before reading the first data byte.

| PROCEDURE RD24ROW: |
|---|
| while (TC not equal 0) |
| load VREG word from VRAM(DST,COL) |
| COL=COL+1 |
| TC=TC−1 |
| assert VREQ |
| read 1st byte from VREGH (msbyte of VREG) |
| read 2nd byte from VREGM (midbyte of VREG) |
| read 3rd byte from VREGL (lsbyte of VREG) |
| remove VREQ |
| endwhile |
| END (wait for next command) |

The 8 bit VRAM row segment read (RD8ROW) transfers only one byte per VRAM location, instead of three. The byte is read from the most significant bye of the VREG, and the rest of VREG is ignored. This command is useful for VRAM diagnostics. The program must wait at least 10 T states after loading the command before reading the first data byte. The complete description of the 8 bit VRAM row segment write operation is:

| PROCEDURE RD8ROW: |
| --- |
| while (TC not equal 0) |
| load VREG word from VRAM(DST,COL) |
| COL=COL+1 |
| TC=TC−1 |
| assert VREQ |
| read one byte from VREGH |
| remove VREQ |
| endwhile |
| END (wait for next command) |

Three types of video RAM write operations are provided: 24 bit VREG only (WR24REG), 24 bit VRAM row segment (WR24ROW), and 8 bit VRAM row segment (WR8ROW). All three may either CPU I/O or VDMA writes. The VREQ bus signal is used to requst DMA bus transfers to the VREG.

During a 24 bit write, the first byte is written into the most significant byte or VREG, the second byte into the middle of VREG, and the third byte into the least significant byte of VREG. If a fourth byte is written, it will go into the most significant byte, and so on.

The 24 bit VREG only write operation (WR24REG) does not transfer any data into the VRAM. The VREQ bus signal is used to request three DMA byte transfers. This operation is automatically terminated after three bytes have been written into the VREG. Another use of the 24 bit VREG only write is to initialize the VREG before a fill operation. The psuedocode for the 24 bit VREG only write operation is:

| PROCEDURE WR24REG: |
| --- |
| assert VREQ |
| write 1st byte into VREGH (msbyte of VREG) |
| write 2nd byte into VREGM (midbyte of VREG) |
| write 3rd byte into VREGL (lsbyte of VREG) |
| remove VREQ |
| END (wait for next command) |

The 24 bit VRAM row segment write (WR24ROW) is the same as the single location write, except that any number of VRAM columns may be updated (in the same VRAM row). As long as TC does not equal zero, the update control will make requests for data to write into VREG (using the VREQ bus signal). Each time three bytes are assembled in the VREG (by VDMA or CPU I/O), the contents of VREG are written into the current VRAM location (DST,COL). If the cursor bit (bit 22) was set, the cursor detector will be triggered. Then COL is incremented, and TC is decremented. If TC is not zero, three more bytes are requested and the process repeats.

| PROCEDURE WR24ROW: |
| --- |
| assert VREQ |
| write 1st byte into VREGH (msbyte of VREG) |
| write 2nd byte into VREGM (midbyte of VREG) |
| write 3rd byte into VREGL (lsbyte of VREG) |
| remove VREQ |
| while (TC not equal 0) |
| write VREG word into VRAM(DST,COL) |
| COL=COL+1 |
| TC=TC−1 |
| assert VREQ |

| -continued |
| --- |
| PROCEDURE WR24ROW: |
| write 1st byte into VREGH (msbyte of VREG) |
| write 2nd byte into VREGM (midbyte of VREG) |
| write 3rd byte into VREGL (lsbyte of VREG) |
| remove VREQ |
| endwhile |
| END (wait for next command) |

The 8 bit VRAM row segment write (WR8ROW) requests only one byte per VRAM location, instead of three. The byte is loaded into the most significant byte of the VREG, and the rest of VREG is unchanged. Once the byte is in VREG, all 24 bits of VREG are written into the VRAM. The 24 bit VREG write operation may be used to initialize the other two bytes of the VREG before starting an 8 bit write operation. The complete description of the 8 bit VRAM row segment write operation is:

| PROCEDURE WR8ROW: |
| --- |
| assert VREQ |
| write one byte into VREGH |
| remove VREQ |
| while (TRC not equal 0) |
| write VREG word into VRAM(DST,COL) |
| COL=COL+1 TC=TC−1 |
| assert VREQ |
| write one byte into VREGH |
| remove VREQ |
| endwhile |
| END (wait for next command) |

As an example of an 8 bit mode screen update, assume that row 5 is to be updated, starting in column 8 and that the screen (and segment) width is 48 characters:

| load registers COL=8 (first column to update) |
| --- |
| DST=5 (row to update) |
| TC=40 (47−8+1 columns to update) |
| enable CTC interrupt on TC=0 |
| CMD=TRESET |
| CMD=WR8ROW |
| Enable VDMA channel |
| CTC interrupts when row segment update is completed |
| Disable VDMA |

Figure 11:
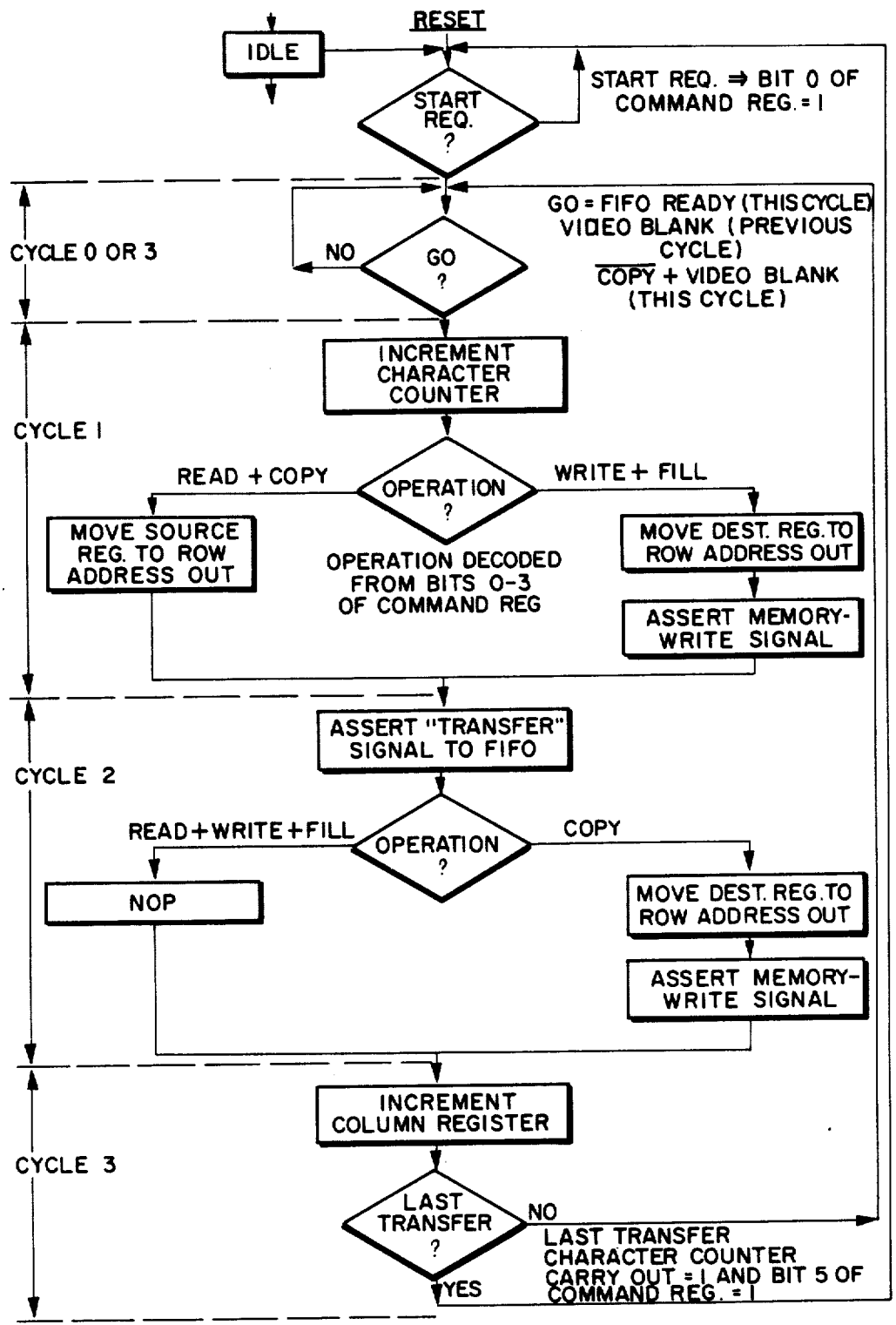
FIG. 11 is a flowchart illustrating the video memory controller operation.

FIG. 11 is a flowchart illustrating the video memory controller operation. These figures show the control sequence for performing a FIFO transfer of any kind.

FIG. 12 is a timing diagram illustrating a video memory read operation.

FIG. 13 is a timing diagram illustrating a video memory write operation.

SCROLLING AND FILLING OPERATIONS

Regarding a copy or scrolling operation, the copy row segment (COPY) operation loads the contents of the current VRAM source location (SRC,COL) into the VREG. During the next VRAM update cycle, the contents of VREG are written into the current VRAM destination location (DST,COL). The column address is advanced and the TC decremented. This continues until TC=0. Repeated line by line COPY operations may be used to scroll screen segments.

| PROCEDURE: "COPY" |
| --- |
| while (TC not equal 0) |

```
-continued
PROCEDURE: "COPY"

load VREG from VRAM(SRC,COL)
    write VREG to VRAM(DST,COL)
    COL=COL+1
    TC=TC-1
    endwhile
END (wait for next command)
```

As a specific example of a scrolling operation, imagine that row 6 is scrolled up 3 rows. Assume the segment is from column 10 to column 59.

```
load SRC=6
DST=3 (move 6 up 3 rows)
COL=10
TC=50
enable TC=0 interrupt
CMD=TRESET
CMD=COPY
row segment copy completed when TC=0 interrupt
  received
```

Regarding a fill operation, as long as TC does not equal zero, the fill row segment (FILL) operation repeatedly writes the contents of the VREG into the current VRAM destination, incrementing COL and decrementing TC. VREG may be initialized for a FILL by using the WR24REG operation. The FILL is useful for "blanking" screen segments, drawing horizontal borders, and performing VRAM diagnostics.

```
PROCEDURE: "FILL"

while (TC not equal 0)
    write VREG to VRAM(DST,COL)
    COL=COL+1
    TC=TC-1
    endwhile
END (wait for next command)
```

As a specific example of a FILL operation, assume that row 12 of a segment is to be blanked. Assume the segment starts in column 20 and ends in column 49.

```
CMD=WR24REG (initialize VREG with a blank) write the
blank character to VREG with 3 CPU OUT instructions
load COL=20
DST=12
TC=30 (49-20+1)
enable TC=0 interrupt
CMD=TRESET
CMD=FILL
row segment fill complete when TC=0 interrupt
  received
```

Figure 14:
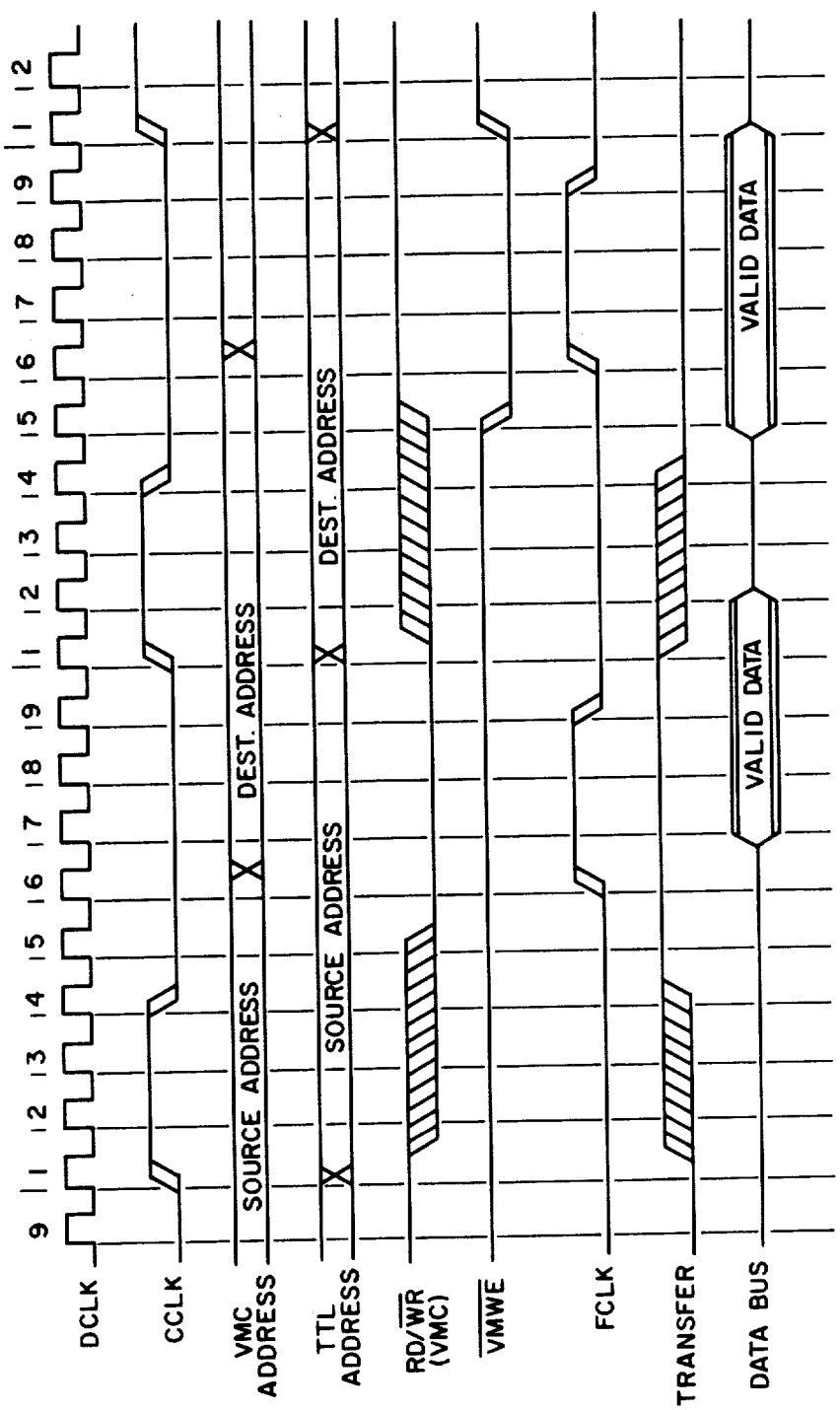
FIG. 14 is a timing diagram illustrating a video memory scrolling operation.

FIG. 14 is a timing diagram illustrating a video memory scrolling operation.

VIDEO MEMORY FIFO REGISTER

Figure 9A:
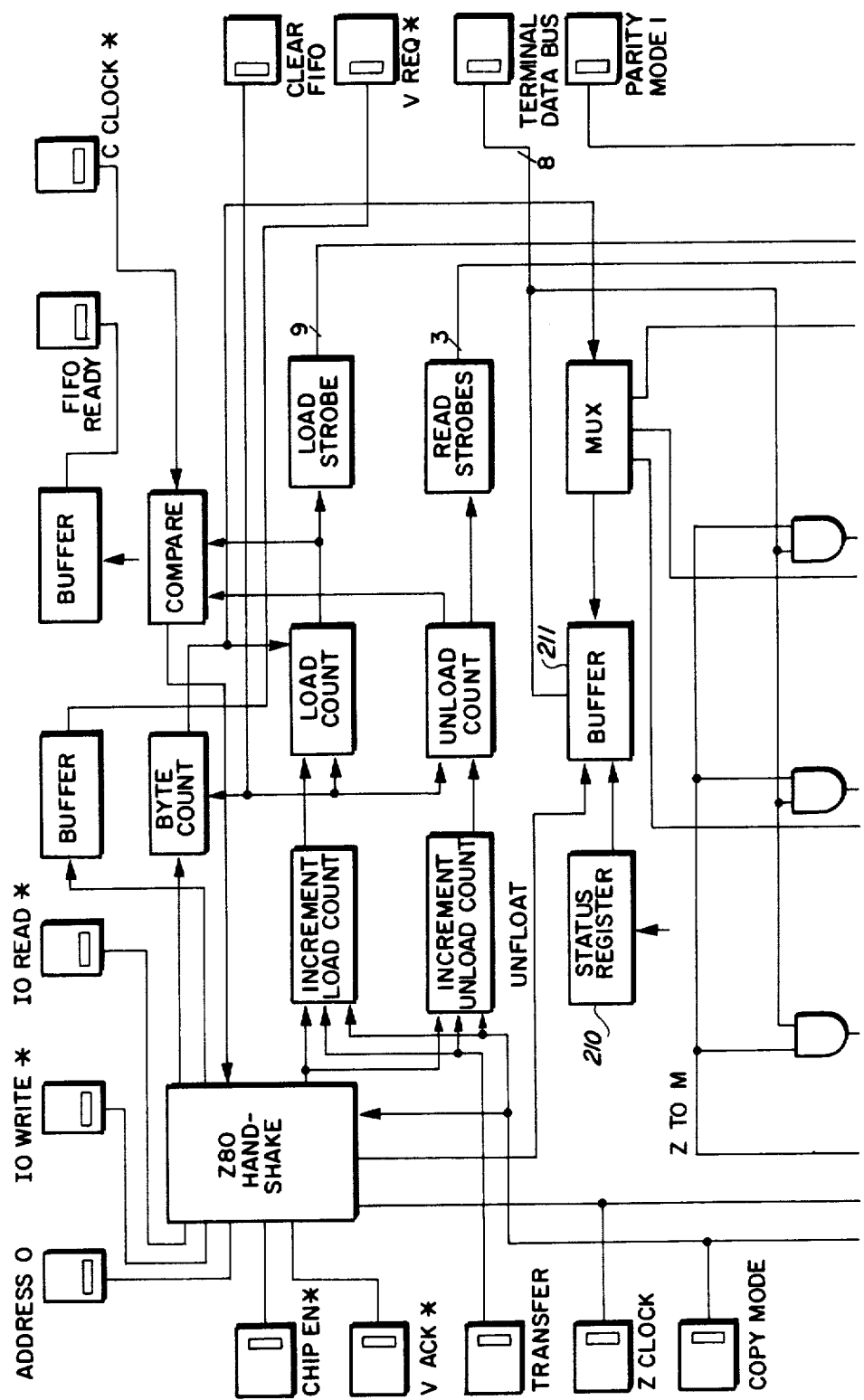

FIGS. 9A and 9B are a detailed block diagram illustrating the video memory FIFO circuitry.

The video data register (FIFO) 86 manages the greatest part of the difference in timing between the terminal DMA data bus 11 and the video RAM 88. There are two kinds of timing incompatibility to be managed. First, the terminal data bus 11 and the video RAM 88 are on different clocks. Second, the video RAM 88 may be updated or readback only during video retrace blank. These timings are matched via a nine-byte queue (3 word × 3 byte) in the FIFO 86. Control of the operation is furnished by the VMC 80 and the terminal MPU 110. The FIFO 86 has logic to report its ready condition. It also may be controlled to act as a 24×3 or an 8×3 memory. Parity for the video RAM 88 is generated by the FIFO 86. The FIFO 86 also interacts with the terminal data bus 11 as a DMA or I/O device for its data transfers and as an I/O port for certain commands. Certain status bits are stored in the FIFO 86 and may be read by the MPU 110.

The control of the FIFO's reads and writes is as follows: The FIFO 86 may accept data from MPU 110 at any time, but it will only write to video RAM 88 during MPU Access Time. Similarly, on readback, the FIFO 86 will only read data from the video RAM 88 during MPU Access Time.

The FIFO 86 contains 72 bits of memory, organized as three 24-bit words of First In, First Out (FIFO) memory. The FIFO treats 8-bit and 24-bit display characters the same. Like the VMC and DLC1 chips, the FIFO chip is controlled by two different clocks: the MPU clock, which times all operations pertaining to the MPU/terminal bus 11, and the Video Character Clock, which times the operations pertaining to the video RAM 88.

In effect, FIFO 86 is capable of operating in four modes. In Write mode, data is placed in the FIFO by the terminal MPU 110 and read out into the video RAM in a First In, First Out manner. In Read mode, data is fetched from the video RAM and brought through the FIFO to the terminal MPU in a First In, First Out manner, also. A Read-Back mode may be programmed for diagnostic purposes by writing, then reading three words or bytes; this mode proceeds in a First In, First Out manner also, in that the first word placed in the FIFO will be the first word returned to the terminal MPU. The fourth mode, scrolling, resembles read-then-write: a word is fetched from memory, routed through the FIFO's buffers, and written back to memory. This mode of operation is only one word deep, and the FIFO chip's internal FIFO registers are not engaged.

The interface to the terminal bus 11 is always 8 bits (1 byte), but the video display logic can work in either 8 or 24 bit mode. In 8 bit mode, the FIFO will pass along bytes of data just as they are received from the MPU 110. In 24 bit mode, the FIFO will build the bytes into 24 bit words (first byte most significant) before presenting them to the video RAM 88. The mode selection, via the op code bits of the VMC CMD register, is under terminal MPU firmware control and must be set before the start of a data transfer.

The interface between FIFO 86 and video RAM 88 is always 24 bits, with one exception: bit 16 is not stored. Bit 16 of a 24-bit display character is used only as a cursor attribute bit. It is not stored in memory, but is passed to the VMC chip, which performs cursor detection logic functions. In the 8 bit mode, the least significant 16 bits are written but not used; i.e., they are stored in the video RAM but ignored by later stages of logic. In passing data to memory in 8 bit mode, bytes 2 and 3 will contain data loaded in 24-bit mode at the last time that mode was used. The FIFO data is never cleared out, only written over.

The primary use of FIFO 86 is to buffer data that is used to update the video RAM 88. However, for cursor blinking and diagnostic purposes, the FIFO is also used to read data back from video RAM to the MPU.

When the FIFO is less than full, it may accept a word of data. The FIFO Ready signal is asserted during this period, and turned off when the FIFO is full. This bit is sent to VMC 80 and posted in the FIFO's internal status register (210, FIG. 9A).

The FIFO generates parity on every write to the video RAM (odd parity normally; even parity under firmware control for diagnostics) and attaches it to the data to be stored. Parity on reads (both by the MPU and by the display) is checked by the VAD chip. If a parity error is detected, the VAD causes the MPU to be interrupted and status is reported by the DLC1 chip.

The memory chips in the video RAM are dynamic; refresh is furnished by the scanning performed during the reading of video data for the screen. In the case of dynamically switching screen sizes, any part of the memory which is temporarily not being displayed will lose its data and must be reinitialized if the screen size is increased.

One mode of data transfer between the MPU 110 and the FIFO 86 is DMA, controlled by the MPU; the other is one in which the MPU may communicate directly with the FIFO via I/O instructions to read or write data. As an I/O port, the FIFO is addressed as Register 0, operating as an 8-bit bidirectional data register. It is possible to perform all FIFO/VMC operations in either I/O instruction or DMA mode from the terminal MPU 110.

The FIFO buffers (211, FIG. 9A) are addressed as Register 0 (port address=84; read and write). This port is used to address the FIFO data buffers during I/O transfers between the MPU 110 and the FIFO 86.

BIT: MSB=7 6 5 4 3 2 1 LSB=0

The FIFO status register 210 is addressed as Register 1 (port address=85; read only). This register contains the FIFO status information, formatted as follows:

BIT: MSB=7 6 5 4 3 2 1 LSB=0
| BC1 | BC0 | LW1 | LW0 | ULW1 | ULW0 | READY | PARITY | where:
PARITY: Most recently generated parity bit.
READY: FIFO Ready for Terminal MPU transfer (should be checked prior to any I/O transfers to or from FIFO's buffers).
ULW1–ULW0: Unload Word Count. These bits indicate the position in the FIFO from which the next word taken from the FIFO would come. Bit assignments are:

| ULW1 | ULW0 | POSITION |
|---|---|---|
| 1 | 0 | First Word |
| 0 | 1 | Second Word |
| 1 | 1 | Third Word |

LW1–LW0: Load Word Count. These bits indicate the position in the FIFO into which the next word would be loaded. Bit assignments are:

| LW1 | LW0 | POSITION |
|---|---|---|
| 1 | 0 | First Word |
| 0 | 1 | Second Word |
| 1 | 1 | Third Word |

BC1–BC0: Byte Count. These bits indicate the byte position from which the next data byte to the MPU will be taken, or into which the next data byte from the MPU will be placed depending on the direction of operation. Bit assignments are:

| BC1 | BC0 | POSITION |
|---|---|---|
| 1 | 0 | Left (first byte) |
| 0 | 1 | Middle (second) |
| 1 | 1 | Right (third) |

Figure 15:
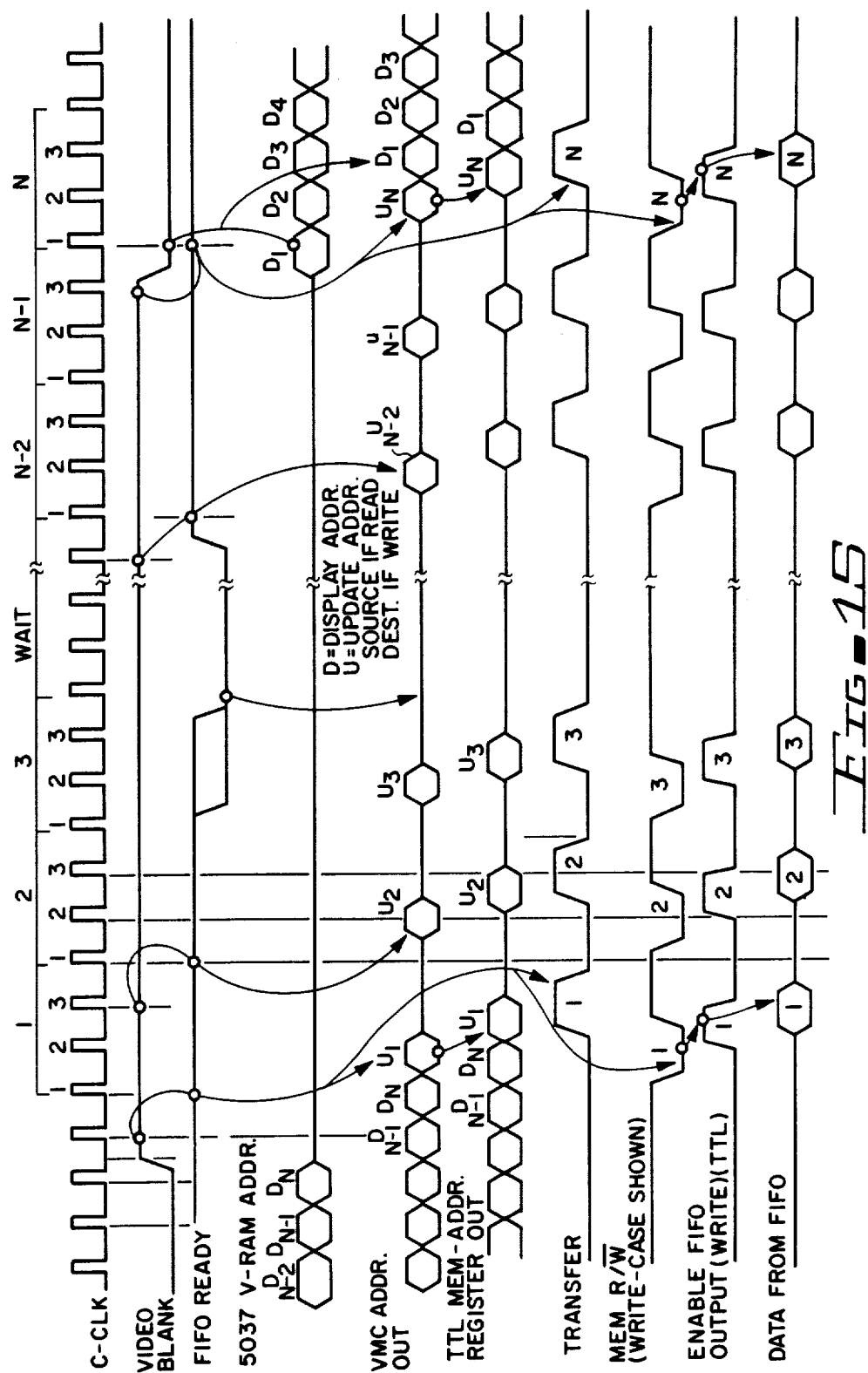
FIG. 15 is a timing diagram illustrating a video memory read, write, or fill operation involving the FIFO.

FIG. 15 is a timing diagram illustrating a video memory read, write, or fill operation involving the FIFO. All timings pertaining to the video RAM are shown in terms of the CCLK (the memory side of the FIFO/VMC). Timings pertaining to the terminal MPU (i.e., those pertaining to reading or writing the internal registers of the VMC and FIFO) are shown in terms of the Z clock of the MPU interface.

Figure 16:
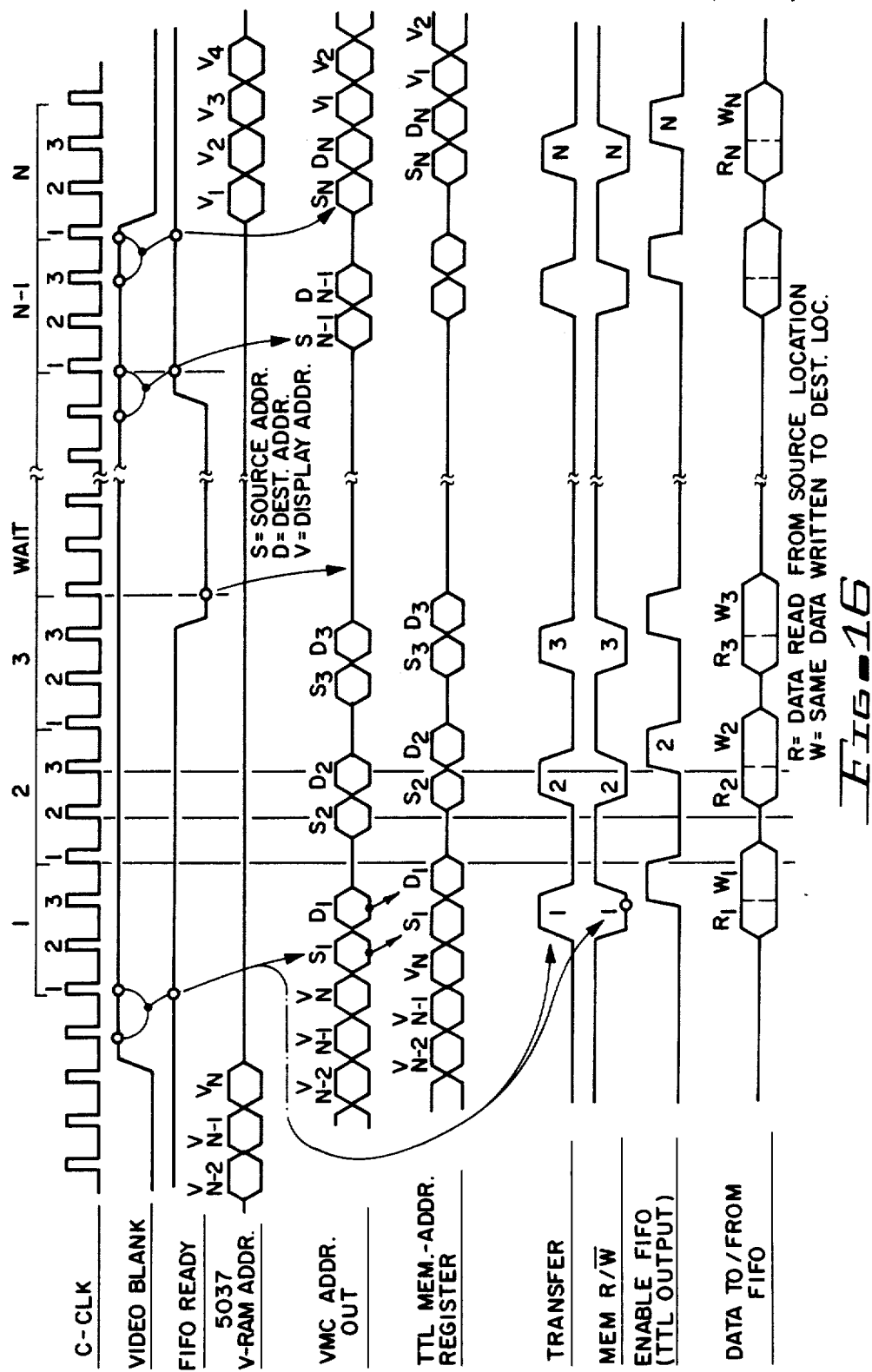
FIG. 16 is a timing diagram illustrating a video memory scroll operation involving the video memory FIFO.

FIG. 16 is a timing diagram illustrating a video memory scroll operation involving the FIFO.

CURSOR DETECTOR OPERATION

As mentioned above, the location of the cursor within each video display segment is monitored, and the result is used to display the cursor within such segments in a manner which may be programmed—e.g., a blinking cursor.

Whenever a video segment is updated in 24 bit mode, a cursor detector is used to spot the cursor location, as shown by the following routine:

```
CMD=CRESET
load COL, DST, TC with appropriate values
enable TC=0 interrupt from CTC
CMD=TRESET
CMD=WR24ROW
Enable VDMA
CTC interrupts when row segment update is complete
Disable VDMA
if (CROW Bit 7 is 0) then
  save CROW, CCOL (a cursor was found, save its
  location)
```

Several times a second a real time clock interrupt (from CTC channel 3) will trigger a cursor blink in the segment, using this routine:

```
load COL=value of CCOL saved above
DST=SRC=value of CROW saved above
if (cursor is off) then
  CMD=RD24ROW
  save the character "under" the cursor using 3 CPU
  IN instructions
  CMD=WR24ROW
  write the cursor character to VREG with 3 CPU OUT
  instructions
else
  CMD=WR24ROW
  write the previously saved character "under" the
  cursor
```

It will be apparent to those skilled in the art that the disclosed video memory controller may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A data processing system comprising:
   a central processor;
   a terminal communicating with said central processor, said terminal comprising:
   a terminal processor,
   a terminal memory connected to said terminal processor for storing data, instructions, and the results of processing operations performed at said terminal,
   a display, said display having a trace time during which information is written to said display, and a retrace time during which information is not written to said display,
   a display memory for storing information to be displayed by said display,
   means for conveying said information stored in said display memory to said display during said trace time,
   buffer means coupled between said terminal processor and said display memory,
   means for reading information from said display memory to said buffer means during said retrace time, and
   means for writing said information back to said display memory during said retrace time in such a manner as to scroll vertically a portion of a line of information being displayed by said display.

2. The data processing system recited in claim 1 and further comprising
   means for writing substantially all of said information back to said display memory during said retrace time, but overwriting a portion of said information with a predetermined character, to thereby perform a fill operation of a portion of a line of information being displayed by said display.

3. The data processing system recited in claim 1 and further comprising
   means for transferring said information from said buffer means to said terminal processor at any time.

4. The data processing system recited in claim 1 and further comprising
   means for storing information concerning the location of a cursor on said display, and
   means responsive to said cursor location information to generate a cursor image at the appropriate location of said display.

5. A data processing system comprising:
   a central processor;
   a terminal communicating with said central processor, said terminal comprising:
   a terminal processor,
   a terminal memory connected to said terminal processor for storing data, instructions, and the results of processing operations performed at said terminal,
   a display, said display having a trace time during which information is written to said display, and a retrace time during which information is not written to said display, said display being segmented into at least two independent display segments,
   a display memory for storing information to be displayed by said display,
   means for conveying said information stored in said display memory to said display during said trace time,
   buffer means coupled between said terminal processor and said display memory,
   means for reading information from said display memory to said buffer means during said retrace time, and
   means for writing said information back to said display memory during said retrace time in such a manner as to scroll vertically a portion of a line of information being displayed by one of said display segments.

6. The data processing system recited in claim 5 and further comprising
   means for overwriting a portion of said information being written back to said display memory with a predetermined character loaded into said buffer means from said terminal memory, to thereby perform a fill operation on a portion of a line of information being displayed by one of said display segments.

7. The data processing system recited in claim 5 and further comprising
   means for transferring said information from said buffer means to said terminal processor at any time.

8. The data processing system recited in claim 5 wherein each display segment has a cursor associated therewith and further comprising
   means for storing information concerning the location of each of said cursors on said display, and
   means responsive to said cursor location information to generate a cursor image at the appropriate location of each of said display segments.

9. In a data processing system comprising
   a central processor and
   a terminal communicating with said central processor, said terminal comprising
   a terminal processor,
   a terminal memory connected to said terminal processor for storing data, instructions, and the results of processing operations performed at said terminal,
   a display having a trace time during which information is written to said display, and a retrace time during which information is not written to said display,
   a display memory for storing information to be displayed by said display,
   means for conveying said information stored in said display memory to said display, and
   buffer means coupled between said terminal processor and said display memory,
   a method for performing data transfers within said terminal, said method comprising the steps of:
   conveying said information stored in said display memory to said display during said trace time,
   transferring information relating to a portion of a line of information being displayed by said display from said display memory to said buffer means during said retrace time, and
   transferring said information from said buffer means back to said display memory during said retrace time to scroll vertically said portion of a line of information being displayed by said display.

10. The method recited in claim 9 and further comprising the steps of:
   loading a predetermined character into said buffer means from said terminal memory, and
   overwriting a portion of said information being transferred back to said display memory with said predetermined character, to thereby perform a fill operation of a portion of a line of data being displayed by said display.

11. The method recited in claim 9 and further comprising the step of:
   transferring information from said buffer means to said terminal processor at any time.

12. The method recited in claim 9 wherein said terminal further comprises means for storing information concerning the location of a cursor on said display, and further comprising the step of:
   generating a cursor image at the appropriate location of said display in response to said cursor location information.

13. The method recited in claim 9 wherein information for segmenting said display into at least two independent display segments is stored in said terminal memory and wherein information concerning the location of a cursor in each of said display segments is stored in a cursor location storage means and further comprising the step of:
   generating a cursor image at the appropriate location of each segment of said display in response to said cursor location information.

* * * * *